US010636182B2

(12) United States Patent
Crespo-Diaz et al.

(10) Patent No.: US 10,636,182 B2
(45) Date of Patent: Apr. 28, 2020

(54) DYNAMIC INTERACTIVE DISPLAY OF MULTI-PARAMETER QUANTITATIVE BIOLOGICAL DATA

(71) Applicant: Becton, Dickinson and Company, Franklin Lakes, NJ (US)

(72) Inventors: Oliver Crespo-Diaz, San Jose, CA (US); Alexander Fainshtein, San Jose, CA (US); Mengxiang Tang, San Jose, CA (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 0 days.

(21) Appl. No.: 16/025,473

(22) Filed: Jul. 2, 2018

(65) Prior Publication Data

US 2019/0026926 A1 Jan. 24, 2019

Related U.S. Application Data

(60) Provisional application No. 62/608,210, filed on Dec. 20, 2017, provisional application No. 62/534,042, filed on Jul. 18, 2017.

(51) Int. Cl.
*G06T 11/20* (2006.01)
*G01N 15/10* (2006.01)
(Continued)

(52) U.S. Cl.
CPC ............ *G06T 11/206* (2013.01); *G01N 15/10* (2013.01); *G01N 15/1429* (2013.01);
(Continued)

(58) Field of Classification Search
None
See application file for complete search history.

(56) References Cited

U.S. PATENT DOCUMENTS 4,845,653 A * 7/1989 Conrad ............... G06F 3/04842
715/805
5,627,040 A 5/1997 Bierre et al.
(Continued)

FOREIGN PATENT DOCUMENTS

FR 2 935 802 3/2010
WO WO 2006/015056 2/2006
(Continued)

OTHER PUBLICATIONS

Brunhart-Lupo et al. "Simulation exploration through immersive parallel planes." 2016 Workshop on Immersive Analytics (IA), IEEE, Mar. 20, 2016. pp. 19-24. (Year: 2016).*
(Continued)

*Primary Examiner* — Xiao M Wu
*Assistant Examiner* — Steven Z Elbinger
(74) *Attorney, Agent, or Firm* — Knobbe Martens Olson & Bear, LLP

(57) ABSTRACT

Data visualization features are described that provide synchronized displaying of interactive visualizations for high parameter data. The visualization features include graphically representing multiple parameters simultaneously with the associated statistical data for each parameter in an interactive way that maintains the contextual relationships between parameters and the related cell population. The visualization features may be used for displaying high parameter multi-color flow cytometry or genomic data sets.

20 Claims, 9 Drawing Sheets

(51) Int. Cl.
*G01N 15/14* (2006.01)
*G06F 3/0484* (2013.01)
*G06T 11/00* (2006.01)
*G06F 3/0354* (2013.01)

(52) U.S. Cl.
CPC ........ *G06F 3/04845* (2013.01); *G06T 11/001* (2013.01); *G01N 2015/1006* (2013.01); *G01N 2015/149* (2013.01); *G01N 2015/1486* (2013.01); *G06F 3/03543* (2013.01); *G06F 3/04842* (2013.01)

(56) References Cited

U.S. PATENT DOCUMENTS

| | | | |
|---|---|---|---|
| 5,739,000 | A | 4/1998 | Bierre et al. |
| 5,795,727 | A | 8/1998 | Bierre et al. |
| 5,917,500 | A * | 6/1999 | Johnson ................ G06T 11/206 345/440 |
| 5,962,238 | A | 10/1999 | Sizto et al. |
| 6,014,904 | A | 1/2000 | Lock |
| 6,944,338 | B2 | 9/2005 | Lock et al. |
| 8,990,047 | B2 | 3/2015 | Zhu et al. |
| 9,567,645 | B2 | 2/2017 | Fan et al. |
| 2006/0031187 | A1* | 2/2006 | Pyrce ................ G06F 3/04815 |
| 2009/0125801 | A1* | 5/2009 | Algreatly .............. G06F 3/0481 715/234 |
| 2010/0191678 | A1* | 7/2010 | Steed .................... G06T 11/206 706/11 |
| 2012/0245889 | A1 | 9/2012 | Zhu et al. |
| 2014/0282124 | A1* | 9/2014 | Grealish ............... G06T 11/206 715/762 |
| 2015/0067566 | A1* | 3/2015 | Baarz .................. G06F 3/04842 715/771 |
| 2016/0188185 | A1* | 6/2016 | Bous .................... G06T 11/206 715/202 |
| 2017/0268981 | A1 | 9/2017 | Diebold et al. |
| 2018/0046935 | A1* | 2/2018 | Amershi ............... G06K 9/6262 |
| 2018/0190000 | A1* | 7/2018 | Berglund .............. G06T 11/206 |

FOREIGN PATENT DOCUMENTS

| | | |
|---|---|---|
| WO | WO 2013/054502 | 4/2013 |
| WO | WO 2016/094720 | 6/2016 |

OTHER PUBLICATIONS

Biosciences, B. D. "BD FACSCalibur Instructions for Use. 2007." https://www.bdbiosciences.com/documents/BD_FACSCalibur_instructions.pdf (Year: 2007).*

International Search Report for International Application No. PCT/US2018/040626 dated Sep. 13, 2018.

International Search Report for International Application No. PCT/US2018/040621 dated Sep. 13, 2018.

Brunhart-Lupo et al. "Simulation exploration through immersive parallel planes." 2016 Workshop on Immersive Analytics (IA), IEEE, Mar. 20, 2016. pp. 19-24.

Falkman, Goran. "Information visualization in clinical Odontology: multidimensional analysis and interactive data exploration." Artificial Intelligence in Medicine. 22(2):133-158. May 1, 2001.

Johansson et al. "On the usability of three-dimensional display in parallel coordinates: Evaluating the efficiency of identifying two-dimensional relationships." Information Visualization. Jan. 1, 2014. pp. 29-41. London, England. Retrieved from the Internet: http://webstaff.itn.liu.se/~jimj094/papers/Eval_3DPC_IVJournal.pdf.

Maksakov, Evgeny. "FlowCytoVis: Visualization Tool for Flow Cytometry Data Standards Project." Dec. 15, 2006. http://www.cs.ubc.ca/~tmm/courses/old533/projects.htm. Retrieved from the internet: http://www.cs.ubc.ca/~tmm/courses/old533/projects/evgeny/report.pdf. Retrieved on Sep. 4, 2018.

Rubel et al. "PointCloudXplore: Visual Analysis of 3D Gene Expression Data Using Physical Views and Parallel Coordinates." Eurovis-Eurographics / IEEE VGTC Symposium on Visualization, Jan. 1, 2006.

Streit et al. "3D parallel coordinate systems—A new data visualization method in the context of microscopy-based multicolor tissue cytometry." NIH Public Access Author Manuscript, vol. 69A, No. 7, May 5, 2006. pp. 601-611.

Bauer et al. (eds.), Clinical Flow Cytometry: Principles and Applications, Williams & Wilkins (Jan. 1993).

Jaroszeski et al. (eds.), Flow Cytometry Protocols, Methods in Molecular Biology No. 91, Humana Press (1997).

Landy et al. (eds.), Clinical Flow Cytometry, Annals of the New York Academy of Sciences vol. 677 (1993).

Ormerod (ed.), Flow Cytometry: A Practical Approach, Oxford Univ. Press (1994).

Pawley (ed.), Handbook of Biological Confocal Microscopy, 2nd Edition, Plenum Press (1989).

Practical Shapiro, Flow Cytometry, 4th ed., Wiley-Liss (2003).

* cited by examiner

DYNAMIC INTERACTIVE DISPLAY OF MULTI-PARAMETER QUANTITATIVE BIOLOGICAL DATA

CROSS-REFERENCE TO RELATED APPLICATION(S)

This application claims priority to U.S. Provisional Application No. 62/534,042, filed on Jul. 18, 2017, which is incorporated by reference in its entirety. This application also claims priority to U.S. Provisional Application No. 62/608,210, filed on Dec. 20, 2017, which is incorporated by reference in its entirety. Any and all priority claims identified in the Application Data Sheet, or any correction thereto, are also hereby incorporated by reference under 37 C.F.R. § 1.57.

BACKGROUND

Technical Field

This disclosure relates to interactive graphic displays, and in particular to dynamic interactive displays of multi-parametric measurements, such as measurements for cells from a sample analyzed by a biological particle analyzer such as a flow cytometer.

Background

Particle analyzers, such as flow and scanning cytometers, are analytical tools that enable the characterization of particles on the basis of optical parameters such as light scatter and fluorescence. In a flow cytometer, for example, particles, such as molecules, analyte-bound beads, or individual cells, in a fluid suspension are passed by a detection region in which the particles are exposed to an excitation light, typically from one or more lasers, and the light scattering and fluorescence properties of the particles are measured. Particles or components thereof typically are labeled with fluorescent dyes to facilitate detection. A multiplicity of different particles or components may be simultaneously detected by using spectrally distinct fluorescent dyes to label the different particles or components. In some implementations, a multiplicity of photodetectors, one for each of the scatter parameters to be measured, and one for each of the distinct dyes to be detected are included in the analyzer. The data obtained comprise the signals measured for each of the light scatter parameters and the fluorescence emissions.

Cytometers may further comprise means for recording the measured data and analyzing the data. For example, data storage and analysis may be carried out using a computer connected to the detection electronics. For example, the data can be stored in tabular form, where each row corresponds to data for one particle, and the columns correspond to each of the measured parameters. The use of standard file formats, such as an "FCS" file format, for storing data from a flow cytometer facilitates analyzing data using separate programs and/or machines. Using current analysis methods, the data typically are displayed in 2-dimensional (2D) plot diagrams for ease of visualization, but other methods may be used to visualize multidimensional data.

The parameters measured using a flow cytometer typically include the excitation light that is scattered by the particle along a mostly forward direction, referred to as forward scatter (FSC), the excitation light that is scattered by the particle in a mostly sideways direction, referred to as side scatter (SSC), and the light emitted from fluorescent molecules in one or more channels (range of frequencies) of the spectrum, referred to as FL1, FL2, etc., or by the fluorescent dye that is primarily detected in that channel. Different cell types can be identified by the scatter parameters and the fluorescence emissions resulting from labeling various cell proteins with dye-labeled antibodies.

Both flow and scanning cytometers are commercially available from, for example, BD Biosciences (San Jose, Calif.). Flow cytometry is described in, for example, Landy et al. (eds.), Clinical Flow Cytometry, Annals of the New York Academy of Sciences Volume 677 (1993); Bauer et al. (eds.), Clinical Flow Cytometry: Principles and Applications, Williams & Wilkins (1993); Ormerod (ed.), Flow Cytometry: A Practical Approach, Oxford Univ. Press (1994); Jaroszeski et al. (eds.), Flow Cytometry Protocols, Methods in Molecular Biology No. 91, Humana Press (1997); and Practical Shapiro, Flow Cytometry, 4th ed., Wiley-Liss (2003); all incorporated herein by reference. Fluorescence imaging microscopy is described in, for example, Pawley (ed.), Handbook of Biological Confocal Microscopy, 2nd Edition, Plenum Press (1989), incorporated herein by reference.

The data obtained from an analysis of cells (or other particles) by multi-color flow cytometry are multidimensional, wherein each cell corresponds to a point in a multi-dimensional space defined by the parameters measured. Populations of cells or particles are identified as clusters of points in the data space. The identification of clusters and, thereby, populations can be carried out manually by drawing a gate around a population displayed in one or more 2-dimensional plot diagrams, referred to as "scatter plots" or "dot plots," of the data. Alternatively, clusters can be identified, and gates that define the limits of the populations, can be determined automatically. Examples of methods for automated gating have been described in, for example, U.S. Pat. Nos. 4,845,653; 5,627,040; 5,739,000; 5,795,727; 5,962,238; 6,014,904; 6,944,338; and 8,990,047, each incorporated herein by reference.

The parameters may include other measurements of a particle. For example, acoustic properties for a particle may be measured and included in the event data. The acoustic property may be directly measured for the particle itself or indirectly measured such as by detecting a change in an acoustic field when the particle interacts with the acoustic field.

For example, in one operational mode, a sample under study can be illuminated concurrently with a plurality of excitation frequencies, each of which can be obtained, e.g., by shifting the central frequency of a laser beam. More specifically, a plurality of sample locations can be concurrently illuminated by a laser beam that is generated by mixing a reference laser beam (herein also referred to as a local oscillator beam) with a plurality of radiofrequency-shifted laser beams such that each sample location is illuminated by the reference beam and one of the radiofrequency-shifted beams to excite a fluorophore of interest at that location, if present. In some embodiments, the reference beam can itself be generated via radiofrequency shifting of a laser beam. Thus, each spatial location of the sample can be "tagged" with a different beat frequency corresponding to a difference between the frequency of the reference beam and that of one of the radiofrequency-shifted beams. In other words, the fluorescence radiation emitted by the fluorophore will spatially encode the beat frequencies. The fluorescence emission can be detected and its frequency components can be analyzed to construct a fluorescence image of the sample.

As another example, a sample can be illuminated successively over a time interval by a laser beam at a plurality of excitation frequencies. In some such embodiments, the excitation frequencies can be obtained by applying a time-varying drive signal to an acousto-optic deflector (AOD), which receives a laser beam. In many embodiments, the laser beam has a frequency in the hundreds of terahertz (THz) range, e.g., in a range of about 300 THz to about 1000 THz. The drive signal applied to the AOD is typically in the radiofrequency range, e.g., in a range of about 10 MHz to about 250 MHz. The passage of the laser beam through the AOD generates a plurality of diffracted beams, each corresponding to a different diffraction order. While the zeroth diffracted beam exhibits no frequency shift relative to the frequency of the input laser beam, the higher-order diffracted beams exhibit a frequency shift relative to the frequency of the input laser beam corresponding to the frequency of the drive signal or a multiple thereof. In some embodiments, the first order diffracted beam having a frequency corresponding to the frequency of the input laser beam shifted by the drive signal is employed as the excitation beam for exciting a fluorophore of interest, if present in a sample under analysis. As the drive signal varies over time, the frequency and angular shift of the first-order diffracted beam also varies, thereby allowing the illumination of the sample at different excitation frequencies at different locations. The fluorescence emission, if any, from each illuminated location can be collected and analyzed to construct a fluorescence image of the sample. Additional features and systems for parameter detection including acoustic properties are described in U.S. Patent Publication No. 20170268981, which is hereby incorporated by reference.

As number of parameters that can be simultaneously measured by flow cytometers or other particle analyzers for a cell or sample increases due to factors such as new fluorochromes or detectors, the event data increases in size and complexity.

SUMMARY

The systems, methods, and devices of the disclosure each have several innovative aspects, no single one of which is solely responsible for the desirable attributes disclosed herein.

In one innovative aspect, a graphics control system for coordinated display of a plurality of representations of multi-parametric data for cells on a graphical user interface is provided. The data for a cell may include respective measurements for a set of parameters. The graphics control system may include a plot generator. The plot generator is configured to dynamically display, via a display device, a parallel coordinate plot diagram. The PCP diagram may represent the set of parameters as a series of axes and include a line connecting measurements for a cell on each of the series of axes for the respective parameter. Each axis is associated with a respective display region of the parallel coordinate plot diagram. The plot generator is further configured to dynamically display an interactive control in the display region of the parallel coordinate plot diagram associated with an axis included in the series of axes associated with a first parameter. The graphics control system also includes an input device port configured to receive, from an input device, a first selection of the interactive control. The plot generator is further configured to, in response to receipt of the first selection of the interactive control, dynamically display, via the display device, a second plot diagram including a vertical axis corresponding to the first parameter and a horizontal axis corresponding to a second parameter of the set of parameters. The second plot diagram includes a graphical indicia for the cell at an intersection point for a first measurement for the first parameter for the cell and a second measurement for the second parameter for the cell.

In some implementations of the graphics control system of the second plot diagram may be a two-dimensional scatter plot diagram.

The input device port may be further configured to receive, from the input device, a second selection identifying an area of interest on the second plot diagram, the area of interest including a first set of cells. The plot generator may be configured to, in response to receipt of the second selection identify, based at least in part on the interaction and the first set of cells, a second set of data points for the first set of cells to display. The plot generator may then apply an adjustment to the display of the second set of data points as shown in: the parallel coordinate plot diagram, and the second plot diagram. The adjustment to the display may include a transition from first renderings of the parallel coordinate plot diagram and the second plot diagram to second renderings of the parallel coordinate plot diagram and the second plot diagram. The plot generator may be configured to apply the adjustment in part by changing colors of lines on the parallel coordinate plot diagram, and graphical indicia for the cell on the second plot diagram such that representations of a second set of cells are distinguished from representations of cells not included in the first set of cells.

The plot generator is configured to change a color included in the colors comprises adjusting at least one of: a brightness level of the color, a hue of the color, a saturation level for the color, or a transparency for the color.

The plot generator may be configured to, in response to receipt of the first selection of the interactive control, skew the display of the parallel coordinate plot diagram by an amount proportional to a level of interaction detected with the interactive control.

In some implementations, the plot generator may be configured to dynamically display the second plot diagram in part by identifying a transition time based at least in part on a characteristic of the display device, the transition time identifying a speed for displaying the second plot. Displaying may also include identifying a number of incremental renderings for transitioning from the first rendering to the second renderings based at least in part on the transition time. A representation of a point for the cell begins at a first location in the first rendering and moves to successive locations in respective incremental renderings to arrive at a final location in the second rendering. In such implementations, the plot generator may cause successive display of the number of incremental renderings.

The input device port may be further configured to receive, from the input device, identification of a movement of the selection away from the axis. The plot generator may be configured to display a third axis extending from the axis identified by the selection. A three-dimensional plot diagram of the first parameter, the second parameter, and a third parameter for the cell may be shown, where a length of the third axis is based at least in part on the movement. The plot generator may be configured to display the second plot diagram in response to the movement exceeding a threshold distance.

The cell may be taken from a sample. The graphics control device may include a particle analyzer input port for receiving, from a particle analyzer (e.g., a flow cytometer or single-cell analysis system), measurements for a second cell from the sample. The plot generator may be configured to display an additional line on the parallel coordinate plot diagram connecting points on the vertical axes corresponding to the measurements for the second cell along with an additional graphic indicator for the second cell at an intersection point for a measurement for the second cell for the first parameter and a measurement for the second cell for the second parameter.

In some implementations of the graphics control system, the input device port may be configured to receive, from the input device, a third selection identifying a plurality of two-dimensional plot diagrams of the flow cytometry data for the cells. Each two-dimensional plot diagram included in the plurality of two-dimensional plot diagrams may represent measurements for the cells along two parameters included in the set of parameters. A common parameter may be represented by the horizontal axes of the two-dimensional plot diagrams, and the vertical axes of the two-dimensional plot diagrams may represent different parameters. The plot generator may be configured to dynamically display the parallel coordinate plot diagram in part based on the selection of two-dimensional plot diagrams. The parameters represented by the vertical axes of the two-dimensional plot diagrams may be shown in the parallel coordinate plot diagram.

In another innovative aspect, a computer-implemented method for coordinated display of a plurality of representations of multi-parametric data for cells on a graphical user interface is provided. The data for a cell includes respective measurements for a set of parameters. The computer-implemented method may be performed under control of one or more processors. The computer-implemented method may include dynamically displaying, via a display device, a parallel coordinate plot diagram representing the set of parameters as a series of axes. The parallel coordinate plot diagram includes a line connecting measurements for a cell on each of the series of axes for the respective parameter from the set of parameters. Each axis is associated with a respective display region of the parallel coordinate plot. The method also includes dynamically displaying an interactive control in the display region of the parallel coordinate plot diagram associated with an axis included in the series of axes associated with a first parameter. The method includes, in response to a first selection of the interactive control, dynamically displaying, via the display device, a second plot diagram including a vertical axis corresponding to the first parameter and a horizontal axis corresponding to a second parameter of the set of parameters. The second plot diagram includes a graphical indicia for the cell at an intersection point for a first measurement for the first parameter for the cell and a second measurement for the second parameter for the cell. The second plot diagram may include or be implemented as a two-dimensional scatter plot diagram.

Some implementations of the method include receiving a second selection identifying an area of interest on the second plot diagram, the area of interest including a first set of cells. The method may include, in response to the second selection identifying the area of interest, identifying, based at least in part on the second selection and the first set of cells, a second set of data points for the first set of cells to display. The method may also include applying an adjustment to the display of the second set of data points as shown in the parallel coordinate plot diagram and the second plot diagram. The adjustment to the display may include a transition from first renderings of the parallel coordinate plot diagram and the second plot diagram to second renderings of the parallel coordinate plot diagram and the second plot diagram. Applying the adjustment may include changing colors of lines on the parallel coordinate plot diagram and graphical indicia for the cell on the second plot diagram. Representations of a second set of cells may be distinguished from representations of cells not included in the first set of cells. Changing a color included in the colors may include adjusting at least one of: a brightness level of the color, a hue of the color, a saturation level for the color, or a transparency for the color.

The method may include, in response to receipt of the first selection of the interactive control, skewing the display of the parallel coordinate plot diagram by an amount proportional to a level of interaction detected with the interactive control.

Dynamically displaying the second plot diagram may include identifying a transition time based at least in part on a characteristic of the display device, the transition time identifying a speed for displaying the second plot. Dynamically displaying the second plot diagram may also include identifying a number of incremental renderings for transitioning from the first rendering to the second renderings based at least in part on the transition time. A representation of a point for the cell begins at a first location in the first rendering and moves to successive locations in respective incremental renderings to arrive at a final location in the second rendering and the method may cause successive display of the number of incremental renderings.

The method may include receiving, from the input device, identification of a movement of the first selection away from the axis. The method may also include causing display of a third axis extending from the axis identified by the selection. A three-dimensional plot diagram of the first parameter, the second parameter, and a third parameter for the cell may be shown, where a length of the third axis is based at least in part on the movement. The displaying of the second plot diagram may be performed in response to the movement exceeding a threshold distance.

The cell may be taken from a sample in some implementations, and the method in such implementations may include receiving, from a particle analyzer, measurements for a second cell from the sample. The method may include displaying an additional line on the parallel coordinate plot diagram connecting points on the vertical axes corresponding to the measurements for the second cell. The method may also include displaying an additional graphic indicator for the second cell at an intersection point for a measurement for the second cell for the first parameter and a measurement for the second cell for the second parameter.

Some implementations of the method may include receiving a third selection of two-dimensional plot diagrams of the data for the cells, each two-dimensional plot diagram representing measurements for the cells along two parameters included in the set of parameters. A common parameter may be represented by the horizontal axis of the two-dimensional plot diagrams, and the vertical axes the two-dimensional plot diagrams may represent different parameters. Dynamically displaying the parallel coordinate plot diagram may include generating the parallel coordinate plot diagram using the selection of two-dimensional plot diagrams. The parameters represented by the vertical axes may be shown in the parallel coordinate plot diagram.

In another innovative aspect, a system for coordinated display of a plurality of representations of multi-parametric cellular data for cells on a graphical user interface is provided. The system includes a particle analyzer configured to detect, for each of the cells, measurements for respective markers. The system includes graphics processing circuitry in communication with the particle analyzer. The graphics processing circuitry is configured to dynamically display, via a display device, a parallel coordinate plot diagram wherein the markers are represented as a series of axes, wherein the parallel coordinate plot diagram includes a line connecting measurements for a cell on each of the series of axes for the respective marker, and wherein each axis is associated with a respective display region of the parallel coordinate plot. The graphics processing circuitry is further configured to dynamically display an interactive control in the display region of the parallel coordinate plot diagram associated with an axis included in the series of axes associated with a first marker. The graphics processing circuitry is configured to, in response to a selection of the interactive control, dynamically display, via the display device, a second plot diagram including a vertical axis corresponding to the first marker and a horizontal axis corresponding to a second marker included in the markers. The second plot diagram includes a graphical indicia for the cell at an intersection point for a first measurement for the first marker for the cell and a second measurement for the second marker for the cell.

In another innovative aspect, a computer-implemented method for displaying a representation of multi-parametric data for particles on a graphical user interface is provided. The data for a particle includes respective measurements for a set of parameters. The computer-implemented method may be performed under control of one or more processors. The method includes dynamically displaying, via a display device, a plot diagram in two-dimensions (e.g., a scatter plot diagram), the plot diagram including: a vertical axis corresponding to a first parameter; a horizontal axis corresponding to a second parameter of the set of parameters; a graphical indicia for a particle at an intersection point for a first measurement for the first parameter for the cell and a second measurement for the second parameter for the particle; and an interactive control configured to transmit rotation information based on an interaction therewith, wherein the rotation information identifies a rotation axis and a rotation quantity. The computer-implemented method also includes receiving, from the display device, a selection of a third parameter included in the set of parameters. The method includes receiving, from the interactive control, the rotation information. The method further includes, in response to receiving the rotation information, dynamically displaying a third axis on the plot diagram based at least in part on the rotation information, wherein the third axis corresponds to the third parameter rendered in a third dimension. The method also includes moving the graphical indicia for the particle to a three-dimensional intersection point including: (i) the first measurement for the first parameter for the particle, (ii) the second measurement for the second parameter for the particle, and (iii) a third measurement for the third parameter for the particle.

The computer-implemented method may include receiving additional rotation information from the interactive control, where the rotation quantity meets or exceeds a rotation threshold. The method may also include terminating the display of the first axis on the plot diagram, wherein, upon said terminating, the plot diagram includes two-dimensions corresponding to the second parameter and the third parameter.

Receiving the selection of the third parameter may include receiving a user input identifying the third parameter. The method may also include storing, in a memory, the third parameter in association with an identifier for the user. The method may also include receiving, from the display device, the identifier for the user and retrieving, from the memory, the third parameter based at least in part on the identifier.

The interactive control may include a first region bounding the vertical axis. Some implementations of the method may include receiving selection information identifying selection of a first point in the first region and receiving deselection information identifying a second point where the selection was terminated. The method may generate the rotation quantity based on a distance between the first point and the second point. The method may generate a rotation angle based on an angle between the first point and the second point.

In some implementations, the particle may be taken from a sample. The computer-implemented method may include receiving measurements, from a particle analyzer, for a second particle from the sample and displaying a second graphical indicia for the second particle at a second intersection point for a third measurement for the first parameter for the second particle and a fourth measurement for the second parameter for the second particle via the two-dimensional plot diagram.

DETAILED DESCRIPTION

Figure 1:
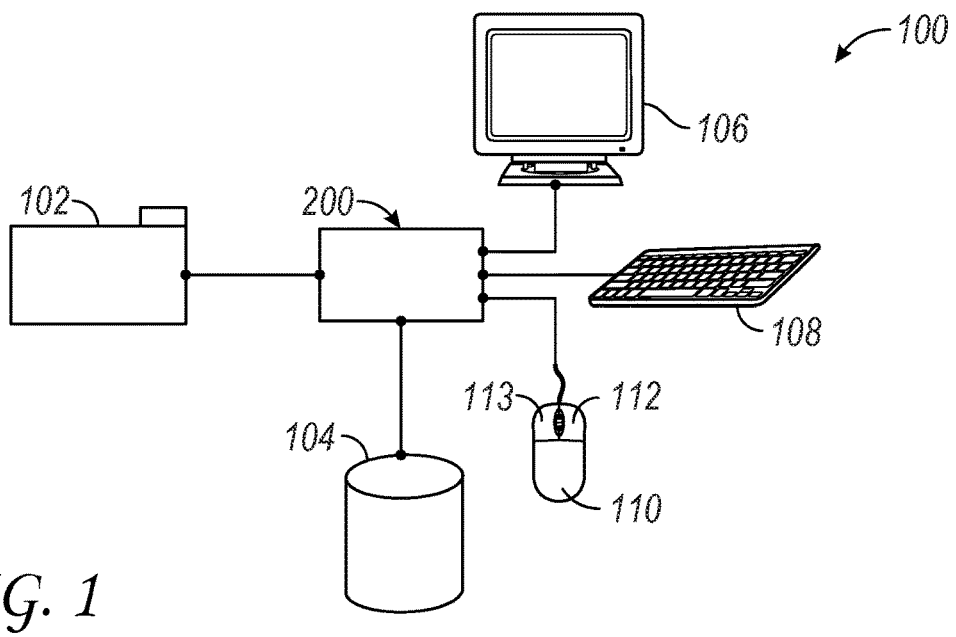
FIG. 1 shows a functional block diagram for one example of a graphics control system for analyzing and displaying cytometric events.

Previous solutions to multi-parametric data analysis for flow cytometry data typically involve the generating and displaying a large number of bivariate plot diagrams side by side or the generating and displaying scatterplot matrices. However, as the number of parameters measured increases, so does the combinations of scatterplot diagrams in the matrix, making the presentation and ultimate analysis of such data increasingly complex. For example, managing the layout of a graphical user interface includes allocating a limited display area for many combinations of the bivariate plot diagrams. The assessment of which combinations to show and where to show the selected combinations introduce complexity to the overall display system.

Parallel coordinate plot diagrams (PCPs) may be included to display or summarize items that have long list of components or attributes associated with them. The list of components or attributes may be referred to as dimensions. How the dimensions are represented can be important to a user for assessing biological meaning to the measurements. However, parallel coordinate plot diagrams only provide a narrow view of the data and can be difficult to represent complex relationships between events or parameters.

In a 2D plot diagram, each data point may correspond to a small area in the plot diagram. A data point can be presented as a small dot or other symbol displayed in this area, or just as a coloring of this area, or in other way. The representation used at the location of this small area may be defined by the values of the parameters of the data point (e.g., measurements for a cell or particle). In a PCP, each data point is usually represented by a line, stretching across the whole plot diagram. Intersections with a set of axes corresponding to specific parameters indicate the measured value for the parameter for a cell.

To address these problems with displaying multi-parameter quantitative biological data, new data visualization features are described that provide a fast and accurate tool for displaying visualizations of high parameter data. The graphics display techniques described require a specific structured graphical user interface paired with a prescribed functionality directly related to the graphical user interface's structure that is addressed to and resolves specific problems in the current visualization arts. The visualization features include graphically representing multiple parameters simultaneously in an interactive way that maintains the contextual relationships between parameters and the related cell population. The visualization features could be used for displaying high parameter multi-color flow cytometry and genomic data sets. High parameter data may refer to a data set including hundreds or thousands of events, with each event being associated with tens or hundreds of different parameter measurements.

In one aspect, the interactive interfaces described maintain continuity between these two representations by extracting 2D plot diagrams out of PCP, or, conversely, by assembling a PCP diagram from multiple 2D plot diagrams. A PCP diagram can be viewed as a "fence" of 2D plot diagrams. Each post in the fence corresponds to a specific parameter. Each post may be associated with an interactive gesture that causes a 2D plot diagram to "pull out" from the PCP diagram giving a visual impression similar to removing a book from a shelf. The process of pulling out may be rendered as a continuous transition, during which the user will observe both the lines representing events and the dots (or other graphic indicia) representing events while these lines and dots are connected to each other. If the gesture exceeds a threshold, the lines and dots may disconnect from each other to display an independent 2D plot diagram.

The interactive interface may also reverse the process by allowing the selection of a 2D plot diagram and then selecting an area on the PCP diagram to insert the 2D plot diagram. The 2D plot diagram is placed "into" the PCP diagram giving the visual impression similar to placing a book onto a shelf. The 2D plot diagram may be adjusted (e.g., expanded, contracted) to correspond to the size of PCP.

In some implementations, the 2D plot diagram may be interacted with to specify which vertical axis is represented in the PCP. As the PCP diagram receives the 2D plot diagram, the interface transitions from 2D dots to dots-and-lines connecting to the PCP diagram and then to a lines-only PCP diagram presentation of the data.

As used herein, "system," "instrument," "apparatus," and "device" generally encompass both the hardware (e.g., mechanical and electronic) and, in some implementations, associated software (e.g., specialized computer programs for graphics control) components.

As used herein, an "event" generally refers to the data measured from or about a single particle, such as a cell or synthetic particle. Typically, the data measured from a single particle include a number of parameters, including one or more light scattering parameters, and at least one fluorescence intensity parameters. Thus, each event is represented as a vector of parameter measurements, wherein each measured parameter corresponds to one dimension of the data space. The dimensions may relate to an intensity, an acoustic property, or other measurement for the cell or synthetic particle detected by a particle analyzer. In some biological applications, event data may correspond to quantitative biological data indicating expression of a particular protein or gene.

As used herein, a "population," or "subpopulation" of particles, such as cells or other particles, generally refers to a group of particles that possess optical properties with respect to one or more measured parameters such that measured parameter data form a cluster in the data space. Thus, populations are recognized as clusters in the data. Conversely, each data cluster generally is interpreted as corresponding to a population of a particular type of cell or particle, although clusters that correspond to noise or background typically also are observed. A cluster may be defined in a subset of the dimensions, e.g., with respect to a subset of the measured parameters, which corresponds to populations that differ in only a subset of the measured parameters.

As used herein, a "gate" generally refers to a boundary identifying a subset of data of interest. In cytometry, a gate may bound a group of events of particular interest. As used herein, "gating" generally refers to the process of defining a gate for a given set of data.

FIG. 1 shows a functional block diagram for one example of a graphics control system for dynamically displaying flow cytometry data. A graphics control system 100 may be configured to implement processes for generating one or more of the graphical user interfaces describe herein.

A flow cytometer 102 may be configured to acquire flow cytometric events. For example, flow cytometer 102 may generate flow cytometric event data. The flow cytometer 102 may be configured to provide flow cytometric events to a graphics controller 200. The graphics controller 200 may be implemented as specially configured graphics processing circuitry to generate, transmit, or receive information for the interfaces described. A data communication channel may be included between the flow cytometer 102 and the graphics controller 200. The flow cytometric events may be provided to the graphics controller 200 via the data communication channel.

Aspects of the description may specifically reference flow cytometers and flow cytometry event data. In some embodiments, other particle analyzers may generate the event data corresponding to other quantitative biological data such as data indicating expression of a particular protein or gene. For example, the event data may indicate the presence of an mRNA sequence within a cell or across a mixed population of cells. The event data may identify an absolute number of gene transcripts of a transcriptome for a cell or cells. Presentation of the event data may be adjusted per cell or per gene expression to provide different perspectives on populations of event data of particular interest (e.g., associated with a particular mRNA sequence, taken from a specific cell, etc.). The event data may be generated using massively parallel single cell analytic features such as those described in U.S. Pat. No. 9,567,645 which is hereby incorporated by reference in its entirety. One commercially available single-cell analysis system is the Becton, Dickinson Rhapsody™ hardware by Becton, Dickinson and Company of Franklin Lakes, N.J. The features discussed may be applied to visualize other or additional quantitative multi-parameter biological data such as that associated with gene expression.

The flow cytometric data may be received in real-time as measurements are collected by the flow cytometer 102. In some implementations, the flow cytometric data may be received via a bulk transfer operation between the flow cytometer 102 and the graphics controller 200. The flow cytometric data received from the flow cytometer 102 may include flow cytometric event data (e.g., measurements of detected fluorescence for one or more markers for each cell included in a sample). The graphics controller 200 may be configured to dynamically generate and display an interface showing flow cytometric events for display via a display device 106. The display device 106 may be implemented as a monitor, a tablet computer, a smartphone, or other electronic device configured to present graphical interfaces.

The graphics controller 200 may be configured to receive a gate selection signal identifying the gate from a first input device. For example, the first input device may be implemented as a mouse 110. The mouse 110 may initiate a gate selection signal to the graphics controller 200 identifying the gate to be displayed on or manipulated via the display device 106 (e.g., by clicking on or in the desired gate when the cursor is positioned there). The gate may also be used to identify the population for displaying additional or alternative interfaces.

The graphics controller 200 may be configured to detect interactions with an interface. The second input device may be implemented as a keyboard 108. The keyboard 108 may control changes in plot diagram visualization by sending a signal identifying a triggering event to the graphics controller 200. For example, activation of a specific key or group of keys on the keyboard 108 may generate a specific interaction. In response to the interaction, the graphics controller 200 may be configured to replace or update the interface(s) displayed on the display device 106.

In displaying ah interface, the graphics controller 200 may specify interactions for specific regions. For example, an interactive object rendered on the display device 106 may respond to a mouse scroll interaction when the cursor is within the first display region. The response may include changing the selected population to a different gated population and rendering a new version of an interface based on the cytometric data for the different gated population. As another example, an interactive region corresponding to a measurement may be associated with a selection interaction. When the interactive region is selected, additional information about the measurements or marker associated therewith may be displayed such as metrics for the measurements for cells, error rate, marker spectral range, or information regarding the cytometric experiment such as entrainment, average flow rate, initial sample size, total cells measured from the sample, sorting information, or the like. Selection of the interactive region may activate the displayed object for movement such as rotation, dragging, dropping, or other change in display position.

An input device may be implemented as one or more of the mouse 110, the keyboard 108, or other means for providing an input signal to the graphics controller 200 such as a touchscreen, a stylus, an optical detector, or a voice recognition system. Some input devices may include multiple inputting functions. In such implementations, the inputting functions may each be considered an input device. For example, as shown in FIG. 1, the mouse 110 includes a right mouse button 112 and a left mouse button 113, each of which may generate unique interactions with the display.

An interaction may cause the graphics controller 200 to alter the manner in which the data is displayed or which portions of the data is actually displayed on the display device 106 or both at the same time.

The graphics controller 200 may be connected to a storage device 104. The storage device 104 may be configured to receive and store flow cytometric events from the graphics controller 200. The storage device 104 may also be configured to receive and store flow cytometric event data from the graphics controller 200. The storage device 104 may be further configured to allow retrieval of flow cytometric events and flow cytometric event data by the graphics controller 200.

A display device 106 may be configured to receive display data from the graphics controller 200. The display data may comprise plot diagrams of flow cytometric events and gates outlining sections of the plot diagrams. The display device 106 may be further configured to alter the information presented according to input received from the graphics controller 200 in conjunction with input from the flow cytometer 102, the storage device 104, the keyboard 108, or the mouse 110.

Figure 2:
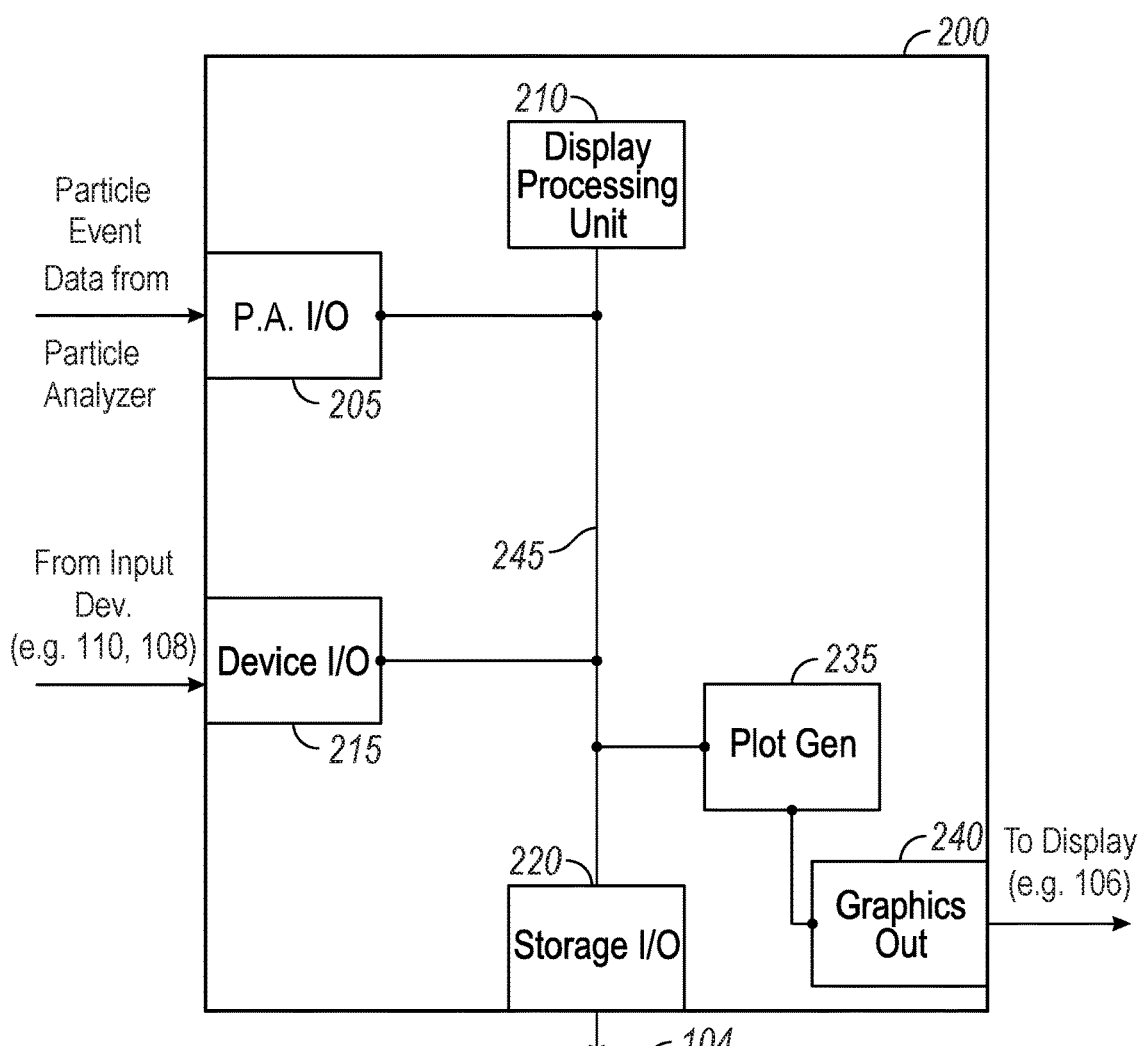
FIG. 2 shows a functional block diagram of an example of a graphics controller.

FIG. 2 shows a functional block diagram of an example of a graphics controller. The graphics controller 200 shown in FIG. 2 may be included in the system 100 shown in FIG. 1. The graphics controller 200 may be implemented as a specially configured device including circuitry for dynamically displaying flow cytometry data during or after cytometric data processing. In some implementations, the graphics controller 200 may be integrated with the flow cytometer 202, a display device 206 (e.g., tablet computer, laptop computer, desktop computer), or other electronic hardware.

The graphics controller 200 may include a particle analyzer input/output (I/O) interface 205. The particle analyzer input/output interface 205 may be configured to receive particle event data (e.g., cytometric event data) from a particle analyzer, such as the flow cytometer 102 shown in FIG. 1. The particle analyzer I/O interface 205 may be a hardware interface providing a path for the event data to be received by the graphics controller 200. For example, the particle analyzer input/output interface 205 may be implemented as a network interface, a Universal Serial Bus interface, a serial data communication interface, memory access device, or other machine-to-machine communication interface. The data may be received in a standardized, machine readable format such as a comma separated list, a token separated list, mark-up language document, or a spreadsheet.

The particle event data received by the graphics controller 200 via the particle analyzer input/output interface 205 may be stored in a storage device such as the storage device 104 shown in FIG. 1. The graphics controller 200 may include a storage input/output (I/O) interface 220 to facilitate storage and retrieval of data to and from a storage device. For example, the storage I/O interface 220 may be implemented as a network interface, a Universal Serial Bus interface, a serial data communication interface, memory access device, or other machine-to-machine communication interface. In some implementations, the storage I/O interface 220 may be configured to generate queries to retrieve information requested by an element of the graphics controller 200. Such queries may be in a standardized query language such as Structured Query Language (SQL). In some implementations, the storage I/O interface 220 may be configured to generate storage commands to persist data in the storage device. SQL update or insert commands are examples of storage commands generated by the storage I/O interface 220.

A display processing unit 210 is shown in FIG. 2. The display processing unit 210 may coordinate the activities of the graphics controller 200. For example, the display processing unit 210 may receive a signal that data has been received via the particle analyzer I/O interface 205. Upon detecting the signal, the display processing unit 210 may transmit an instruction to route the data to the storage I/O interface 220 for storage. The display processing unit 210 may coordinate the activities according to a preconfigured set of machine readable instructions.

The display processing unit 210 may coordinate interaction information received from an input device via a device input/output (I/O) interface 215. The graphics controller 200 shown in FIG. 2 includes the device input/output (I/O) interface 215. The device I/O interface 215 may receive signals or messages from input devices such as a mouse or keyboard. The display processing unit 210 may detect an input signal and adjust a display as will be described in further detail. One input signal may include a message to begin displaying flow cytometric data. The input signal may include an identifier for the cytometric experiment for which data should be displayed. Using this identifier, the event data may be retrieved such as via the storage I/O interface 220 or from a particle analyzer via the particle analyzer I/O interface 205.

The graphics controller 200 may include a plot generator 235. The plot generator 235 may be configured to generate a computer displayable graphic representation of the event data such an interactive parallel coordinate plot diagram or an interactive cube plot diagram. The plot generator 255 may be triggered by the display processing unit 210 to generate the plot diagram. The triggering event may include receipt of particle data or experiment data via the particle analyzer I/O interface 205. In some implementations, the triggering event may include the selection of a group of cells (e.g., a gated population) received via the device I/O interface 215. The triggering event may include an interaction with an interactive control element shown on the display.

The plot generator 235 may then generate a specific interface tailored to the data and the target display device. The representation may then be provided to a display via a graphics output interface 240. The graphics output interface 240 may be one or more of a video graphics array (VGA) interface, a high definition multimedia interface (HDMI), a wired or wireless network interface, or other communication means configured to provide the described interactive graphic data, directly or indirectly, to a display device.

The elements included in the graphics controller 200 may be coupled by a bus 245. The bus 245 may be a data bus, communication bus, or other bus mechanism to enable the various components of the graphics controller 200 to exchange information. It will further be appreciated that while different elements have been shown, multiple features may be combined into a single element, such as the plot generator 235 and the display processing unit 210. Furthermore, additional elements may be included in the graphics controller 200 to support the features described. For example, a power source is not shown but may be included to provide power for the graphics controller 200. This can allow the graphics controller 200 to operate as a standalone graphics control hub to receive data from one or more particle analyzers, receive inputs from one or more input devices, and display interfaces one or more display devices.

Figure 3B:
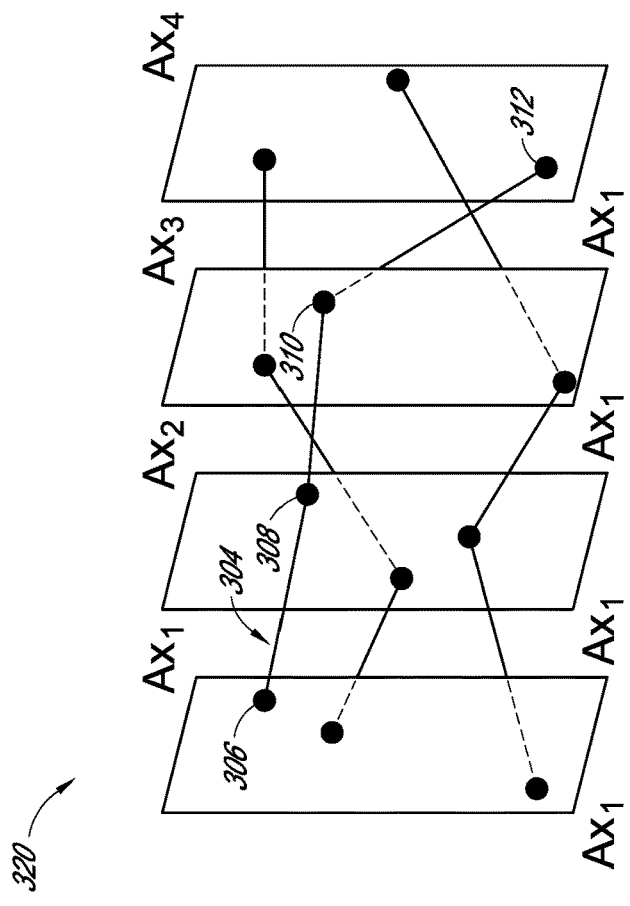
FIG. 3B shows a conceptual representation of the parallel coordinate plot diagram shown in FIG. 3A.
Figure 3A:
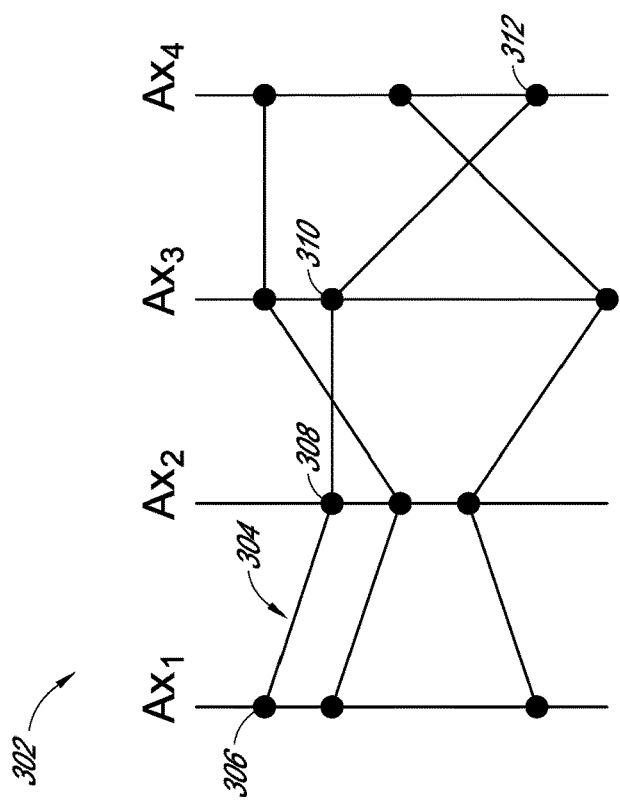
FIG. 3A shows an example parallel coordinate plot diagram.

FIG. 3A shows an example parallel coordinate plot diagram. The parallel coordinate plot (PCP) diagram 302 includes vertical axes for a variety of markers. As shown in FIG. 3A, measurements for four markers (AX1, AX2, AX3 and AX4) are presented. Measurements for a cell are represented by a line 304 where the line 304 for the cell crosses a vertical axis at the measured value for the marker associated with the vertical axis. As shown in FIG. 3A, the measured value corresponds to a fluorescent intensity for the cell for the associated marker. Four measurement points are shown, 306, 308, 310, and 312, one measurement corresponding to each axis.

FIG. 3B shows a conceptual representation of the parallel coordinate plot diagram shown in FIG. 3A. Because each point may be associated with a cell that may have a set of measurements associated therewith, a given axis may be visualized as a two-dimensional plot diagram. In FIG. 3B, the diagram 302 from FIG. 3A is skewed to the right to provide a three dimensional representation 320. The measurement points (e.g., 306, 308, 310, and 312) and the line 304 from FIG. 3A are similarly labeled in the representation 320 to show the relationship between vertical axes of the parallel coordinate plot diagram 302.

The representation 320 may be analogized to books on a shelf whereby the spine of each book corresponds to the vertical axis of a two dimensional plot diagram. In such an implementation, additional two-dimensional plot diagrams may be added to the "shelf" to increase the number of parameters shown in the parallel coordinate plot diagram.

Figure 4A:
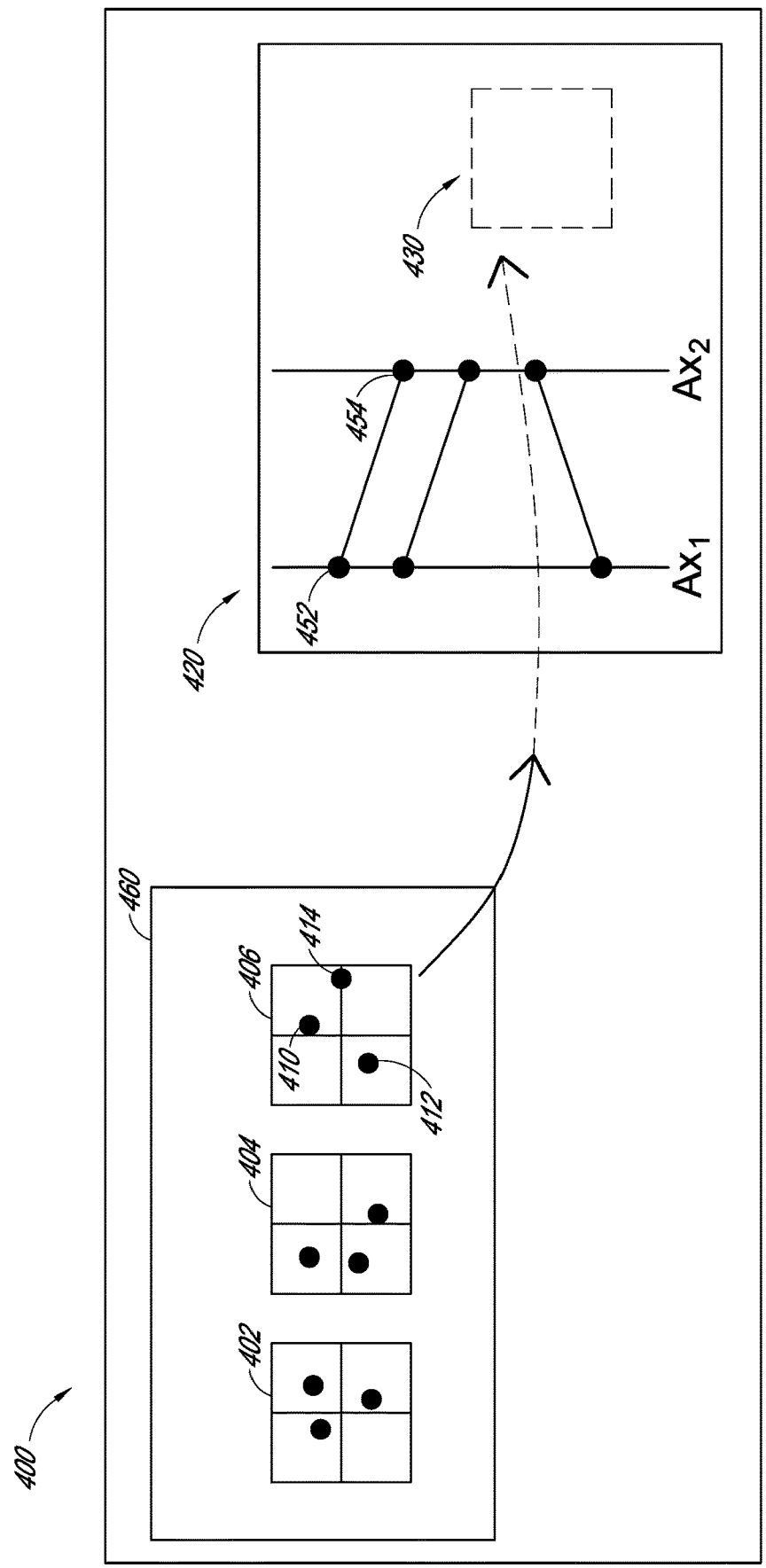
FIG. 4A shows an example interface for assembling a parallel coordinate plot diagram from two-dimensional plot diagrams.

FIG. 4A shows an example interface for assembling a parallel coordinate plot diagram from two-dimensional plot diagrams. The interface 400 may be displayed on a display device such as the display 106 shown in FIG. 1. The interface 400 may be generated by a graphics controller such as the graphics controller 200 shown in FIG. 2. For example, the plot generator 235 may generate or access pre-generated two-dimensional plot diagrams for flow cytometry data. The flow cytometry data may be identified using a file name or other identifier for a stored set of flow data. In some implementations, the flow cytometry data may be received in real-time as cells for a sample are being analyzed by a flow cytometer. Plot diagrams 402, 404, and 406 may be displayed in a first area 460 of the interface 400. The plot diagrams 402, 404, and 406 may be thumbnail images of the two-dimensional plot diagrams. The plot diagrams may show at least a portion of the measurements for cells such as points 410, 412, and 414 in plot diagram 406.

The interface 400 may include a second area 420 for displaying and assembling a parallel coordinate plot diagram. The second area 420 shown in FIG. 4A includes a parallel coordinate plot diagram with two axes (AX1 and AX2). The parallel coordinate plot diagram shows three lines representing measurements for three different cells or particles. Point 452 represents the measurement for a cell or particle for a marker associated with axis AX1. Point 454 represents the measurement for the cell or particle for a second marker associated with axis AX2.

The second area 420 may include an assembly zone 430. The assembly zone 430 may be a predefined area within the second area 420 as shown in FIG. 4A. In some implementations, the second area 420, in total, may be considered the assembly zone 430. The assembly zone 430 may indicate where a two-dimensional plot diagram may be added to the parallel coordinate plot diagram shown in the second area 420. For example, a user may select one of the plot diagrams in the first area 460 and then interact with the assembly zone 430 to indicate that the selected plot diagram is to be added to the parallel coordinate plot diagram. The interaction may include a dragging interaction from the first area 460 to the second area 420 or the specific assembly zone 430.

To ensure visual continuity from the two-dimensional plot diagram as it is added to the parallel coordinate plot diagram, as the selected diagram enters the assembly zone 430, the selected diagram may be altered to provide a visual impression similar to a book being added to a shelf.

Figure 4C:
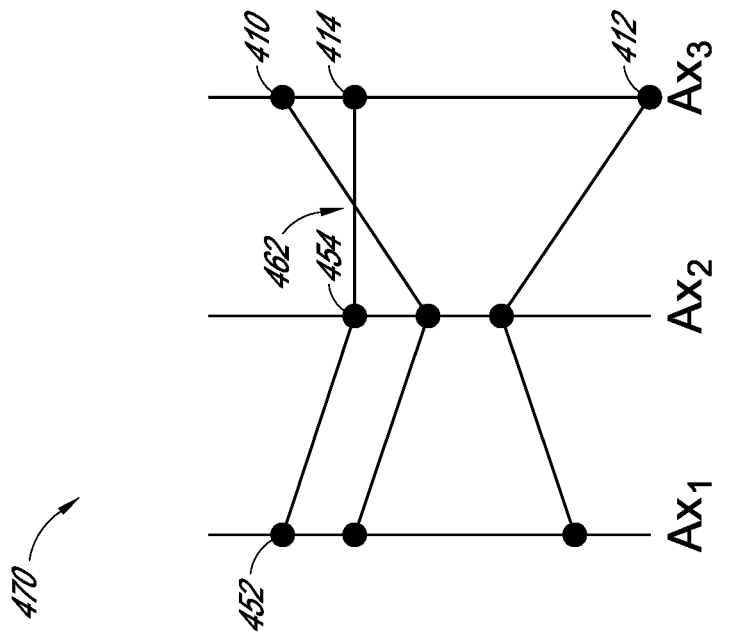
FIG. 4C shows an example interface of a parallel coordinate plot diagram assembled using a two-dimensional plot diagram.
Figure 4B:
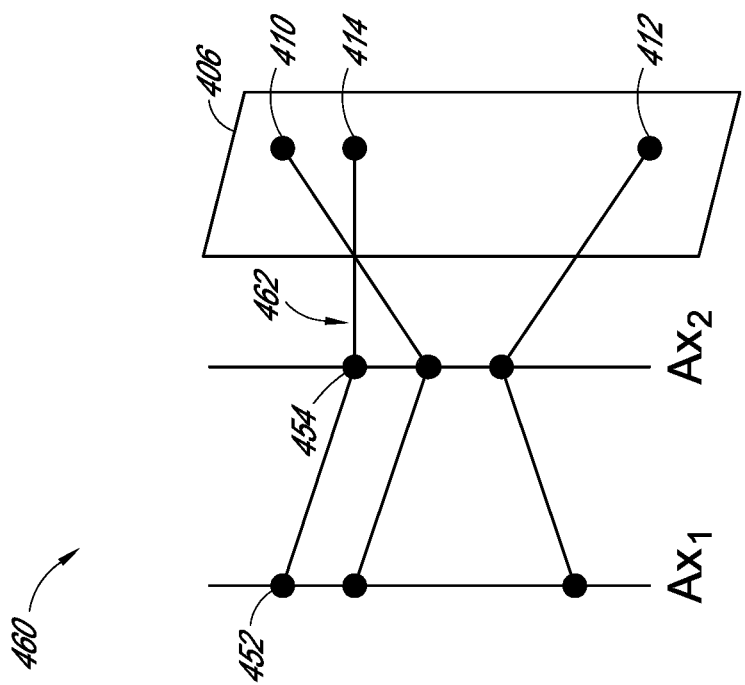
FIG. 4B shows an example interface during assembly of a parallel coordinate plot diagram by adding a two-dimensional plot diagram.

FIG. 4B shows an example interface during assembly of a parallel coordinate plot diagram by adding a two-dimensional plot diagram. As shown in FIG. 4B, the two-dimensional plot diagram 406 is shown in a skewed perspective. The skew may be identified relative to the interaction with the assembly zone 430. For example, as the diagram 406 is dragged from the first area 460, the diagram 406 may be displayed with perpendicular axes. As the diagram is dragged toward the assembly zone 430, the diagram 406 may be skewed based on a skew amount. The skew amount may be generated dynamically based on the location of the diagram 406 during the interaction. Equation (1) provides one example expression of how the skew amount for the diagram 406 may be generated. The skew amount may be identified in degrees of skew, or a weighting factor applied to a set of display parameters used to render the diagram 406 such as height, width, shadowing, etc.

$$s_{current} = s_{max}\left(1 - \left(\frac{d_{current}}{d_{start}}\right)\right) \quad \text{Equation (1)}$$

where: $s_{current}$ represents a current skew amount for a diagram;
$s_{max}$ represents a predetermined maximum skew amount;
$d_{current}$ represents a distance from the diagram as currently displayed to the assembly zone; and
$d_{start}$ represents a distance from the diagram as displayed before interaction to the assembly zone.

FIG. 4B also illustrates how the relationships for the measurements for the cells shown in the diagram 406 are related to the measurements shown in the parallel coordinate plot diagram. For example, as the diagram 406 is moved to the right of the interface 460, lines may be displayed connecting the corresponding measurements for the cells shown on the parallel coordinate plot diagram with the measurements included in the two-dimensional diagram 406. As shown in FIG. 4B, a cell may be associated with points 452 and 454 in the parallel coordinate plot diagram. As the diagram 406 is displayed during an assembly interaction on to the right of the axis AX2, a line 462 may be rendered to connect point 454 with point 414 which may correspond to the measurement for the cell shown in the diagram 406. The line 462 may be rendered to give the visual impression of a third spatial dimension. In this way, a continuity of display is maintained during the assembly of the parallel coordinate plot diagram.

FIG. 4C shows an example interface of a parallel coordinate plot diagram assembled using a two-dimensional plot diagram. The interface 470 shown in FIG. 4C represents the display once the diagram 406 is "added" to the parallel coordinate plot diagram. In FIG. 4C, the PCP diagram includes a third axis AX3 with the points 410, 412, and 414 connected with respective lines to the measurements corresponding to the cells associated with the points, such as line 462 discussed above.

Figure 5:
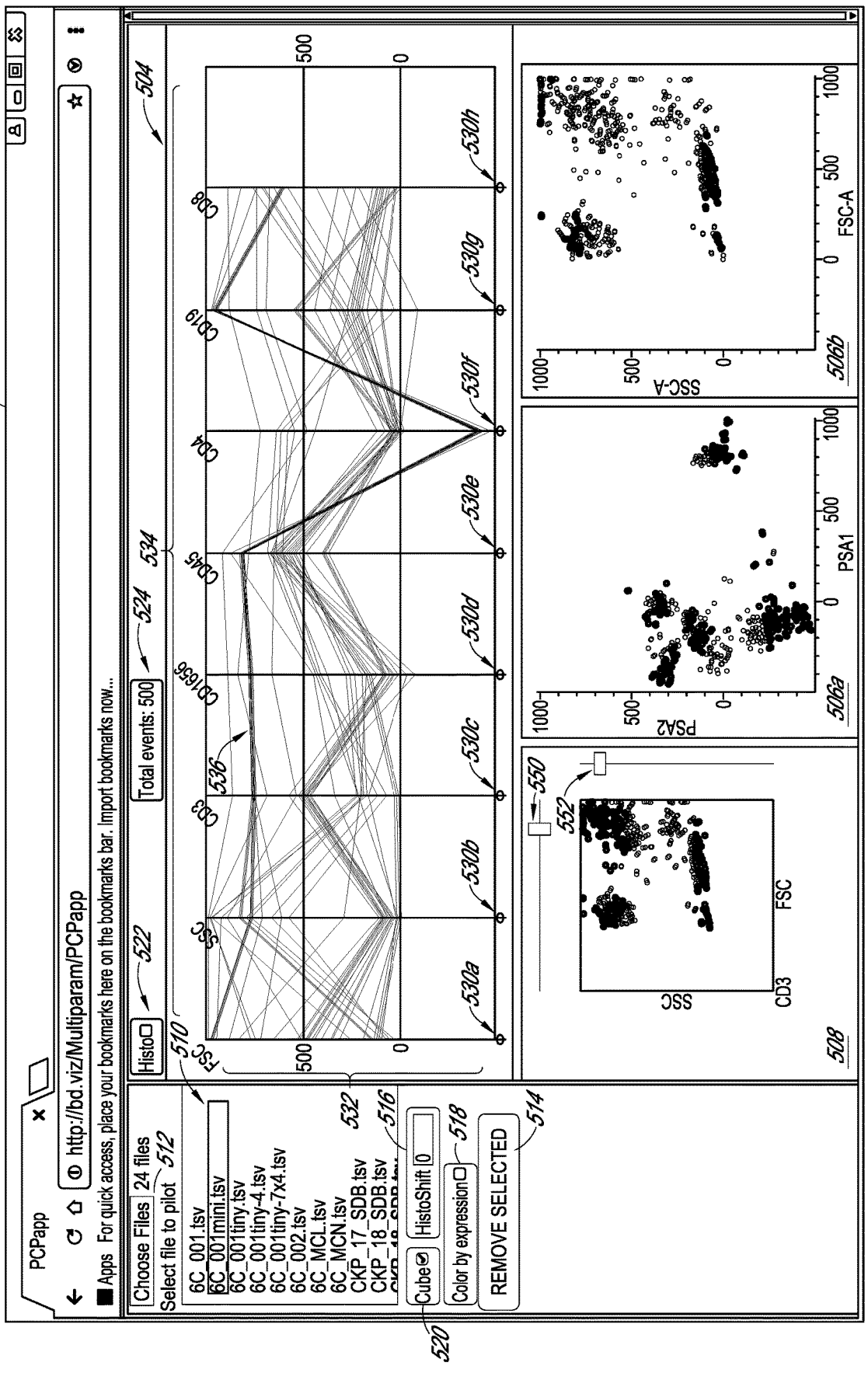
FIG. 5 shows an example interface for interactive display of multi-parameter flow cytometry data.

FIG. 5 shows an example interface for interactive display of multi-parameter flow cytometry data. The interface 500 may be used to provide the diagrams described in a common display such as within a web-browser or other application window 502. The interface 500 may include a choose file control element 512. The choose file control element 512 may be an interactive control element that, when activated, causes the interface to solicit information identifying flow cytometry data for display. The input may identify a file, a flow cytometer, or other source of flow cytometry data. Selected sources may be listed in a list box 510 or other selectable interface element (e.g., drop down, thumbnail library, scrollable display, etc.). A user may interact with the sources listed in the list box 510 to activate or deactivate display of the associated flow cytometry data. For example, in some implementations, the data for a given sample may span multiple files. In such instances, it may be desirable to selectively view portions of the flow cytometry data. In some implementations, it may be desirable to select data for removal from the interface 500. A remove selected element 514 may be included in the interface 500. When the remove selected element 514 is activated, data displayed on a diagram included in the interface 500 may be removed from the interface 500.

The interface 500 may include a color by expression selector 518. Depending on the activation state, the color by expression selector 518 toggles between two coloring modes. In a first state (e.g., checked or selected), a color of the line may be defined by the expression of the event on the selected axis. For example, the hue of the color used to render the line may be proportional to the height at which the line intersects the axis. In a second state (e.g., unchecked or unselected), the hue may be proportional to the sequential number of the line on the selected axis such as when counting from bottom of the axis up. While similar to rendering based on expression, the sequential based color scheme provides a wider variety of colors.

The interface 500 may include a histogram selector 522. The histogram selector 522, when activated, may converts a diagram such as a PCP diagram included on the interface 500 into set of two-dimensional diagrams such as histograms. In some implementations, the set of two-dimensional diagrams may be rotated by 90 degrees on each axis. Other control elements may be included on the interface 500 such as input element 516 to adjust the display properties of the interface 500 or diagram(s) presented therein.

The interface 500 may also include diagrams for visualizing the selected flow cytometry data. The interface 500 shown in FIG. 5 includes an interactive parallel coordinate plot diagram 504, two two-dimensional scatter plot diagrams 506A and 506B, and an interactive cube diagram 508A. The interactive parallel coordinate plot diagram 504 displays a set of vertical axes 534 each representing a parameter or marker measured in the flow cytometry data. A measurement scale 532 provides a reference for the measurements shown on each of the axes 534. The measurements may indicate intensity for a given cell or particle for the marker associated with the axis. The interface 500 may include metrics 524 for the displayed data such a total number of cells or particles shown. For example, if the interface 500 is not showing all events/lines, this metrics 524 may include two values: (i) total events count and (ii) displayed events count. As another example, when a subset of events are selected (e.g., gated), the metrics 524 may be updated to display a value indicating the number of selected events.

Each of the axes 534 may be associated with an interactive control (530a through 530h) (collectively or individually referred to as interactive control 530). The interactive control 530 may be a displayable graphic or symbol. In some implementations, the interactive control 530 may be the axis. The interactive control 530 may be activated such as through a click or touch event. When activated, a two-dimensional plot diagram corresponding to the activated axis may be displayed.

Figure 6A:
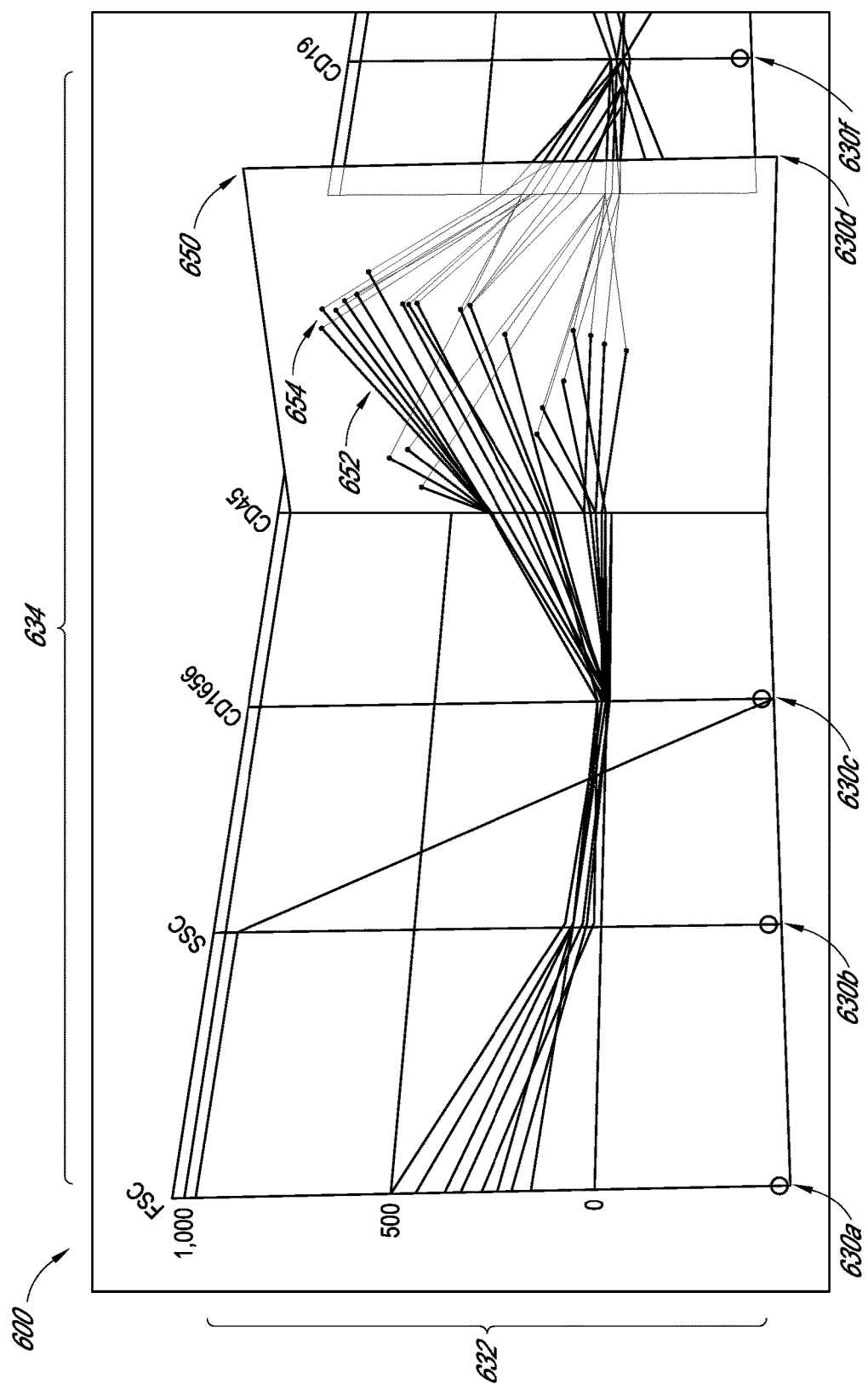
FIG. 6A shows an example of an interactive parallel coordinate plot diagram with an axis selected.

FIG. 6A shows an example of an interactive parallel coordinate plot diagram with an axis selected. As shown in FIG. 6A, the parallel coordinate plot diagram includes a set of vertical axes 634 with corresponding lines connecting measurements for cells or particles between the axes 634. The interactive parallel coordinate plot diagram 600 includes interactive controls 630a through 630e. In FIG. 6A, interactive control 630d has been activated to display a partial two-dimensional plot diagram 650. The partial two-dimensional plot diagram 650 is represented as if it were extending in a third spatial dimension from the interactive parallel coordinate plot diagram 600. As the partial two-dimensional plot diagram 650 is displayed, lines 652 corresponding to cells or particles are drawn from a graphic indicia 654 on the partial two-dimensional plot diagram 650 to a corresponding measurement on a neighboring vertical axis (CD1656 as shown in FIG. 6A). This maintains visual continuity between the points plotted in the partial two-dimensional plot diagram 650 and the measurements shown in the interactive parallel coordinate plot diagram 600.

The distance the partial diagram 650 is displayed from the interactive parallel coordinate plot diagram 600 may be dynamically assessed based at least in part on the interaction with the interactive control 630d. For example, if the interaction is a mouse click, the distance the mouse moves may indicate how far to extend the partial diagram 650. It will be noted that the parallel coordinate plot diagram 600 skewed slighted to facilitate display of the third spatial dimension. The amount of skew may be dynamically assessed based on the distance the partial diagram 650 is extending from the base diagram 600. The amount may be proportional to the distance such that the farther out the partial diagram 650 extends, the higher the skew. In some implementations, the skew may be capped at a predetermined maximum such that any further extension of the partial diagram 650 beyond the cap would not skew the base diagram 600 any further.

Figure 6B:
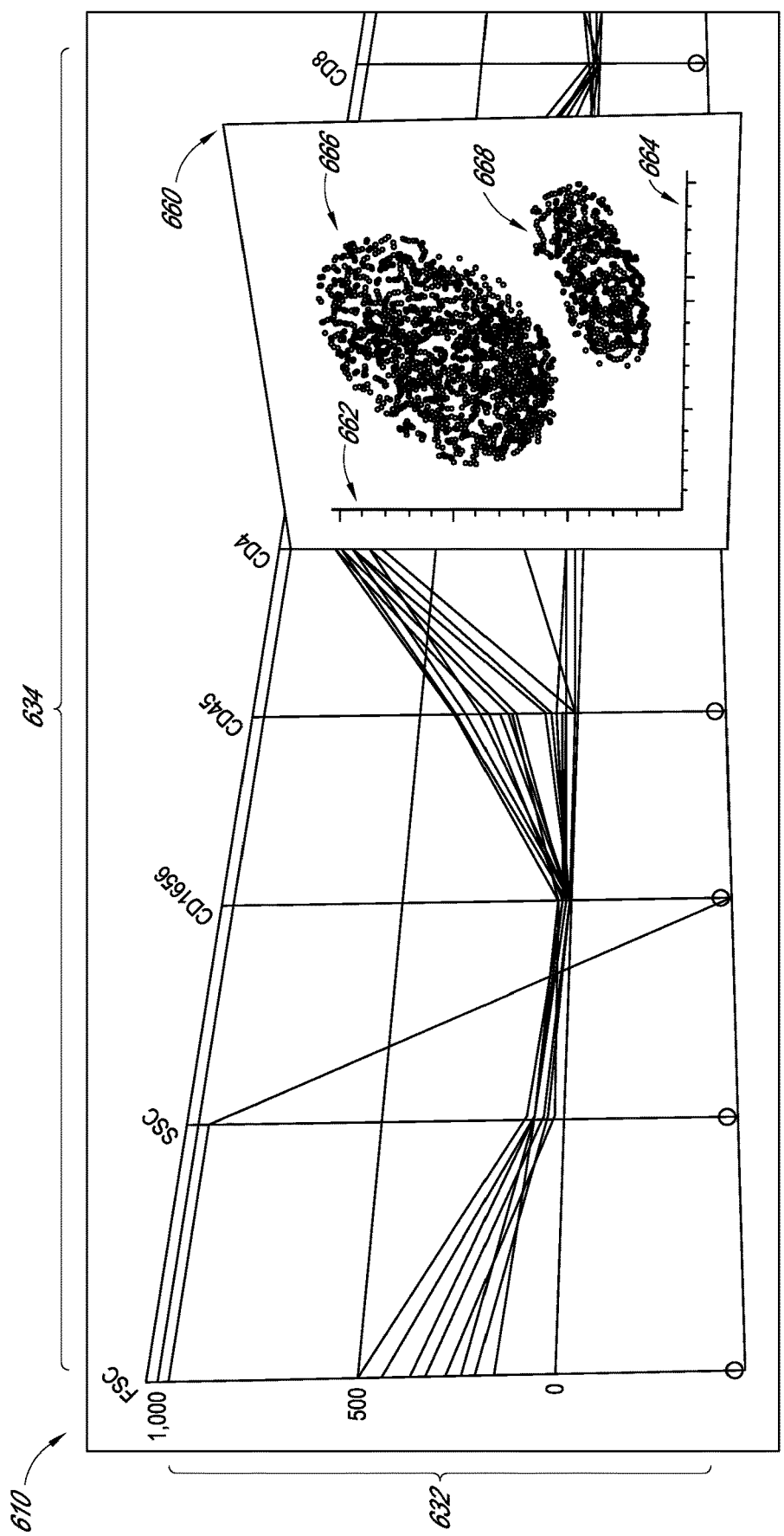
FIG. 6B shows an example of the interactive parallel coordinate plot diagram of FIG. 6A with a two-dimensional plot diagram displayed for the selected axis.

FIG. 6B shows an example of the interactive parallel coordinate plot diagram of FIG. 6A with a two-dimensional plot diagram displayed for the selected axis. In FIG. 6B, a full two-dimensional plot diagram 660. The full two-dimensional plot diagram 660 may omit the lines showing a connection to the neighboring axes (e.g., lines 652 shown in FIG. 6A). The full two-dimensional diagram 660 includes an X-axis 664 and a Y-axis 662. The Y-axis corresponds to the measurements for a first marker (e.g., CD4). The X-axis corresponds to the measurements for a second marker. The second marker may be predefined in the preferences or configuration. In some implementations, the second marker may be selected using a separate control element (not shown). The separate control element may be selected before pulling the plot out. The second marker may be selected from a dropdown list that pops up when user selects the axis or the symbol for the axis.

The full two-dimensional plot diagram 600 also includes two populations 666 and 668 of cells or particles. Further interaction with the full two-dimensional plot diagram 600 or the interactive control element associated therewith may cause separation of the display of the full two-dimensional plot diagram 600 from the interactive parallel coordinate plot diagram 610. Upon separation, the full two-dimensional plot diagram 600 may be displayed in a second area of an interface, such as the interface 500 shown in FIG. 5.

Returning to FIG. 5, the two-dimensional plot 506a or 506b may be displayed as a result of the separation described with reference to FIG. 6B. In some implementations, the separation may cause the rendering of a cube plot diagram. In some implementations, a two-dimensional plot diagram may be selectively displayed as a cube plot diagram by selecting a control element such as a cube selector element 520. The cube selector element 520 may activate cube display controls for one or more of the two-dimensional plot diagrams displayed on the interface 500. Once activated, the two-dimensional plot diagram may be referred to as an interactive cube plot diagram. It will be appreciated that a two-dimensional plot diagram need not be separated from a parallel coordinate plot diagram to present two-dimensional diagrams. In some implementations, the interface 500 may include one or more interactive control elements to identify two parameters for presenting a two-dimensional plot diagram which can thereafter display a third dimension when activated as a cube plot diagram.

In FIG. 5, the interface 500 includes the interactive cube plot diagram 508A. The interface 500 may include a horizontal cube display control element 550 and a vertical cube display control element 552. The cube display control elements 550 and 552 are shown as sliders, but may be implemented as other interactive control elements such as dials, text inputs, buttons, or drop down menus to provide a quantity of rotation in the vertical or horizontal direction. In some implementations, areas of the two-dimensional plot diagram may be associated with interactions to cause rotation. For example, the vertical axis may be selected and, once selected, rotated using a gesture. A similar selecting of a vertical axis followed by a gesture may be used to rotate in a horizontal direction.

Figure 7:
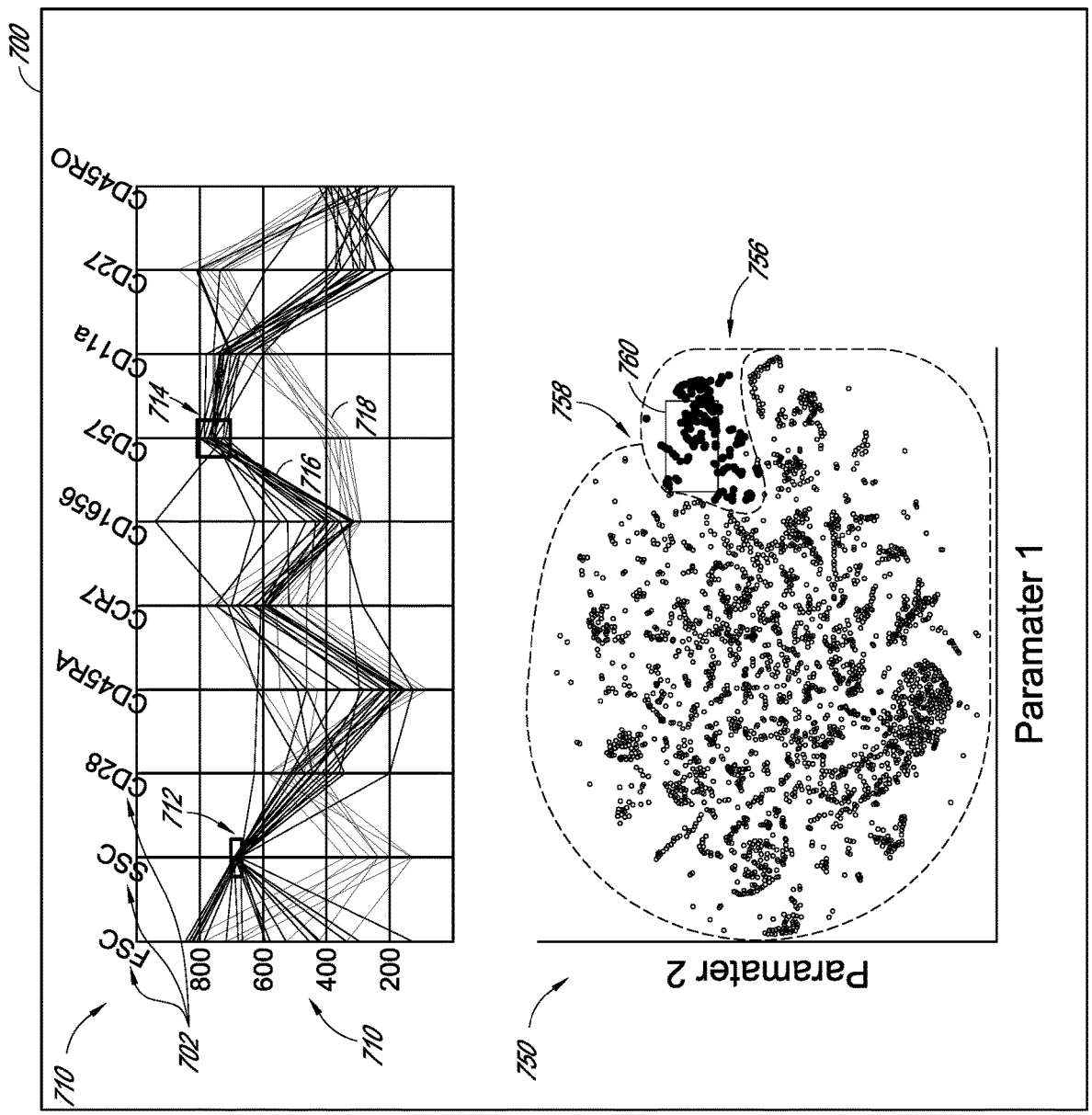
FIG. 7 shows an example interface for coordinated display of multi-parameter data between a parallel coordinate plot diagram and a two-dimensional plot diagram.

FIG. 7 shows an example interface for coordinated display of multi-parameter data between a parallel coordinate plot diagram and a two-dimensional plot diagram. The diagrams described may be used to display multi-parameter data. In some implementations, the diagrams may be used as selection tools to identify, for example, groups of cells or particles. The selection may be referred to as gating. It may be desirable to coordinate a selection made on one diagram with the display of a second diagram to provide visual continuity of the selected cells or particles as represented in different diagrams.

The interface 700 shown in FIG. 7 may be provided via a web browser or other application. The interface 700 includes a parallel coordinate plot diagram 710 and a two-dimensional scatter plot diagram 750. The PCP diagram 710 includes a set of vertical axes 702 with lines 716 and 718 representing measurements for respective cells or particles. The PCP diagram 710 may receive a selection 712 or 714 to identify particular cells or particles associated with a desired measurement range. Selecting these cells or particles may cause a change to the lines displayed in the PCP diagram 710 to differentiate those associated with the selections and those which are not selected. For example, the lines 718 may be presented in a first color or at a lower intensity than the lines 716 associated with the selected cells or particles.

The coordination may occur to adjust display of the cells or particles selected in the PCP diagram 710 as represented in the two-dimensional scatter plot diagram 750. As shown a first group of graphic indicators 758 may be presented in a first color and correspond to the cells or particles that are not selected in the PCP diagram 710. A second group of graphic indicators 756 may be presented in a second color and correspond to the cells or particles selected in the PCP diagram 710. In this way, the selection made on the PCP diagram 710 is also reflected in the two-dimensional plot diagram. The adjustment may be based on detecting the selection of a group of cells on the PCP diagram 710. A graphics controller may then identify the selected group and apply a color adjustment to the representations of the group in the displayed diagrams. In some implementations, more than two diagrams may be updated. For example, the display of the four diagrams shown in FIG. 5 may be coordinated.

Similarly, a gate 760 may be drawn on the two-dimensional scatter plot diagram 750. Upon detecting the gate 760, the graphics controller may update the PCP diagram 710 or other diagram displayed on the interface 700 to visually distinguish the aggregated selections from the PCP diagram 710 and the gate 760. This provides further visual continuity between different dimensional views of the flow cytometry data.

Figure 8:
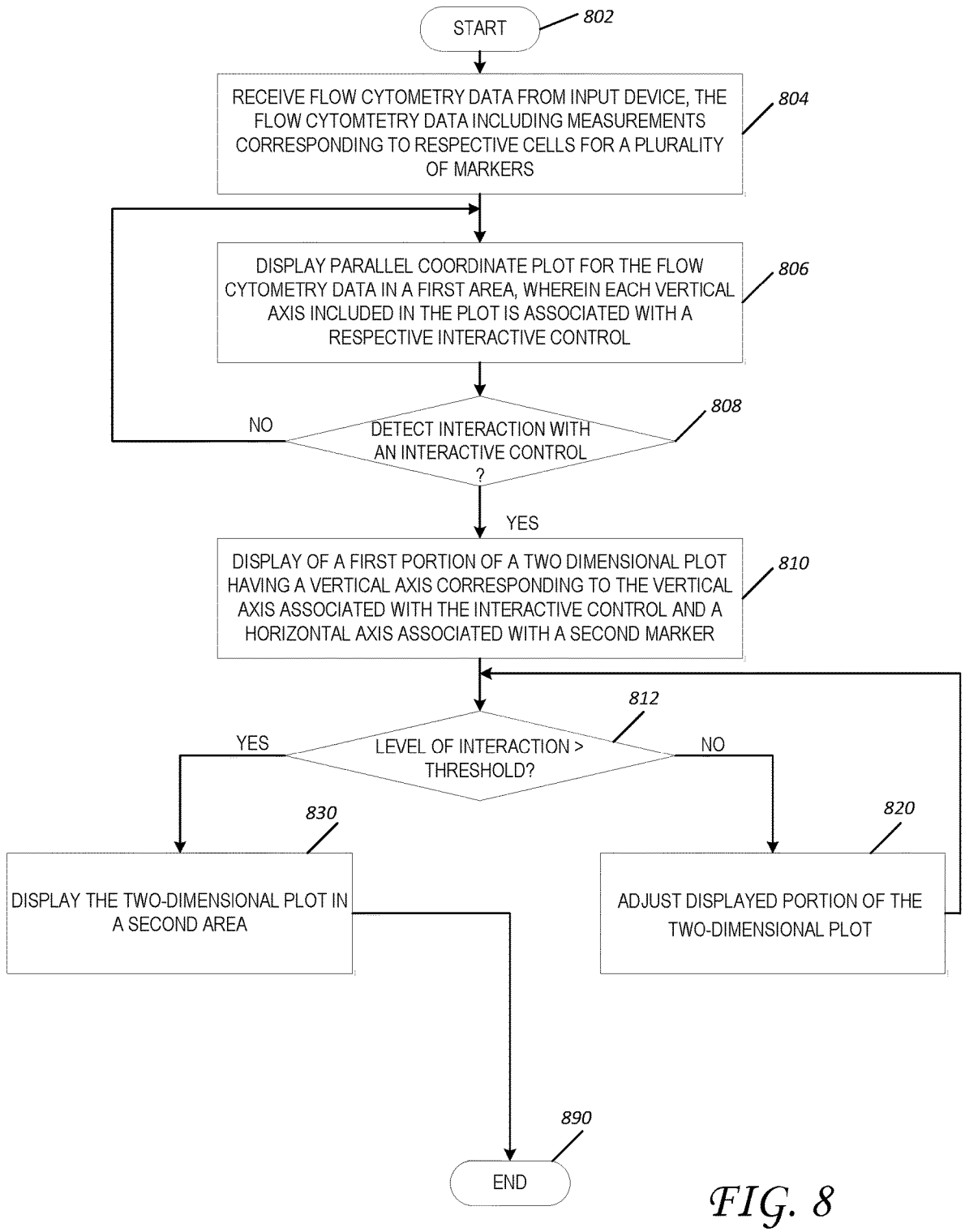
FIG. 8 is a process flow diagram of an example method of coordinated display of a plurality of representations of multi-parametric flow cytometry data for cells on a graphical user interface.

FIG. 8 is a process flow diagram of an example method of coordinated display of a plurality of representations of multi-parametric flow cytometry data for cells on a graphical user interface. The method 800 may be implemented in whole or in part by one or more of the devices described, such as those shown in FIG. 1 or FIG. 2. The method 800 illustrates how a dynamic user interface may be generated and displayed to ensure consistency between representations and efficient use of allocated display area. The interface may include a representation of multi-parametric flow cytometry data, or other event data, for cells on a graphical user interface. The flow cytometry data for a cell may include respective measurements for a set of parameters (e.g., markers). One example of the interface generated by the method 800 includes the interfaces shown in FIG. 5, FIG. 6A, or FIG. 6B.

The method 800 begins at block 802. At block 804, a graphics controller may receive flow cytometry data from an input device or a flow cytometer. The flow cytometry data may include measurements corresponding to respective cells for a set of markers. Table 1 provides an example of measurements for a small set of cells. It will be appreciated that the flow cytometry data may include hundreds of thousands or millions of cells or particles each with a corresponding set of measurements for each marker in a set of marker. The set of markers may include n elements where n is five, ten, twenty, twenty-five, or more.

TABLE 1

| Cell/Particle No. | Marker 1 measurement | Marker 2 measurement | Marker 3 measurement | ... | Marker n measurement |
|---|---|---|---|---|---|
| 1 | 500 | 326 | 300 | ... | 401 |
| 2 | 479 | 402 | 367 | ... | 393 |
| 3 | 601 | 476 | 413 | ... | 296 |
| ... | ... | ... | ... | ... | ... |

The receipt at block 804 may include loading the flow cytometry data from memory. In some implementations, the receipt may include receiving the flow cytometry data from a flow cytometer as the measurements are collected for cells included in a sample (e.g., in "real time").

At block 806, the graphics controller may generate and display a parallel coordinate plot (PCP) diagram for the flow cytometry data in a first area on a display device. The PCP diagram may include a series of vertical axes. Each of the vertical axes may represent measurements for a specific marker. In some implementations, the PCP diagram may be an interactive PCP diagram such as that shown in FIG. 5, FIG. 6A or FIG. 6B. Each axis included in the PCP diagram may be associated with a respective interactive control. The interactive control may be a discrete element displayed proximate to an axis. In some implementations, the interactive control may be associated with an area such as a bounding box that encompasses the axis.

At block 808, the graphics controller may determine whether an interaction with an interactive control has been detected. The detection may be based on receipt of a message identifying a selected interactive control received from an input device such as a mouse, touchscreen, keyboard, or the like. In some implementations, the interaction may be referred to as an event. The graphics controller may queue events as received for processing at an appropriate time such as when sufficient resources (e.g., power, memory, processor load, etc.) are available to the graphics controller. The sufficiency may be identified using predetermined resource threshold whereby a current resource level may be compared to the threshold to determine whether the graphics controller has sufficient resources. In some implementations, the events may be processed as the message is received.

If no interaction is detected, the method 800 may return to block 806 to continue displaying the PCP diagram. In some implementations, the method 800 may receive additional flow cytometry data such as during real time receipt of measurements from a flow cytometer. In some implementations, additional data may be received based on, for example, receipt of a new file including the measurements for new cells.

Returning to block 808, if the graphics controller determines that there was an interaction with the interactive control, at block 810, a first portion of a two-dimensional plot diagram may be displayed. The display may be similar to that shown in FIG. 6A. A vertical axis of the two-dimensional plot diagram may include a vertical axis corresponding to the vertical axis associated with the interactive control associated with the interaction. The message indicating the interaction may include an identifier. In some implementations, the identifier may indicate the interactive control interacted with. The identifier may then be used to identify the axis associated with the control. In some implementations, the message indicating the interaction may include an identifier for the vertical axis. The horizontal axis of the two-dimensional plot diagram may be associated with a second marker. The second marker may be identified based on one or more of a configuration value, an input control signal such as a selection element, keystroke, or gesture, or other similar selection.

Displaying the first portion of the two-dimensional plot diagram may include presenting graphic indicators representing the respective measurements of the cells for the first and second markers. Displaying may also include connecting graphic indicators to the PCP diagram such as rendering a line from a point on a vertical axis in the PCP diagram for a cell to the graphic indicator for the cell shown in the two-dimensional plot diagram.

Displaying at block 810 may include identifying a transition time based at least in part on a characteristic of the display device on which the interface is shown. The transition time may identify a speed for displaying the two-dimensional plot diagram. The transition time may dictate a number of incremental renderings for displaying the portion of the two-dimensional plot diagram to provide the visual impression of the two-dimensional plot diagram extending from the PCP diagram in relation to the level of interaction with the interactive control. This provides a coordinated look and feel to the presentation of the two-dimensional plot diagram. A representation of a point for a cell may be displayed at a first location in a first rendering and move to successive locations in respective incremental renderings to arrive at a final location in a final rendering such as the portion of the two-dimensional plot diagram. The displaying at block 810 may include presenting the incremental renderings to provide an animated display.

The length of the horizontal axis may be determined based on the interaction. For example, if the interaction is a mouse drag, the horizontal axis may be extended to a point on the interface where the drag interaction stopped. As another example, if the interaction is a touch selection, the force used to touch may identify how far the horizontal axis extends such that more force causes a larger portion of the two-dimensional plot diagram to be displayed.

The graphics controller may determine, at block 812, whether the level of interaction exceeds a threshold. This threshold may be used to identify when the two-dimensional plot diagram should be displayed separately from the PCP diagram. The threshold may be identified based on the location of the interaction. For example, in the example of the drag event, the threshold may be the length of the horizontal axis for the two-dimensional plot diagram. If the drag distance exceeds the length of the horizontal axis, then the determination at block 812 may be affirmative. If affirmative, at block 830, the two-dimensional plot diagram may be displayed in a second area of the interface. In some implementations, the second area may permit concurrent display of the PCP diagram with the two-dimensional plot diagram. In some implementations, the second area may comprise a layer whereby the two-dimensional plot diagram may be shown in a top layer that at least partially obscures the PCP diagram in a lower layer. The method 800 may then end at block 890.

Returning to block 812, if the threshold is not exceeded, at block 820, the graphics controller may adjust the display to show additional portion of the two-dimensional plot diagram or remove a portion of the two-dimensional plot diagram. As discussed, the amount shown may be dynamically determined based on the level or type of interaction. In some implementations, the interaction detected after presentation of the first portion may indicate that the two-dimensional plot diagram should be hidden (e.g., put back "into" the PCP diagram). Similar techniques of assessing the quantity of the diagram to show/hide can be applied for interactions indicating movement toward the PCP diagram. After adjusting the display, the method 800 may return to decision block 812 to identify further interactions as described. The method 800 may end at block 890 after displaying the two-dimensional plot diagram.

The interface described informs the user in a more convenient and efficient manner than existing systems. Researchers gain a significant advantage by seeing multiple parameters in a single view because they can see the relationships between different markers for a group of cells without switching views and thereby lose contextual display representing important relationships between the measurements displayed. Presenting the parameters as described retains the contextual relationship between the multiple dimensions on a single interface.

When the interface is updated in real time, the progression of an experiment can be observed and used to identify adjustments to the flow cytometer or particle analyzing device. For example, trends in the measurements for cells of interest, the function of the flow cytometer, or other relevant characteristics are more easily identifiable by the user through the use of the present invention. Furthermore, the interface described provides a concise and efficient representation of large sets of multi-parameter data such as those associated with a flow cytometry experiment or single-cell gene expression experiment.

As used herein, the terms "determine" or "determining" encompass a wide variety of actions. For example, "determining" may include calculating, computing, processing, deriving, generating, obtaining, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. Also, "determining" may include resolving, selecting, choosing, establishing, and the like via a hardware element without user intervention.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, and the like via a hardware element.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a "user interface" (also referred to as an interactive user interface, a graphical user interface or a UI) may refer to a network based interface including data fields, buttons, or other interactive controls for receiving input signals or providing electronic information or for providing information to the user in response to any received input signals. A UI may be implemented in whole or in part using technologies such as hyper-text mark-up language (HTML), JAVASCRIPT™, FLASH™, JAVA™, .NET™, WINDOWS OS™, macOS™, web services, or rich site summary (RSS). In some implementations, a UI may be included in a stand-alone client (for example, thick client, fat client) configured to communicate (e.g., send or receive data) in accordance with one or more of the aspects described.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the term "message" encompasses a wide variety of formats for communicating (e.g., transmitting or receiving) information. A message may include a machine readable aggregation of information such as an XML, document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein, a phrase referring to "at least one of" a list of items refers to any combination of those items, including single members. As an example, "at least one of: a, b, or c" is intended to cover: a, b, c, a-b, a-c, b-c, and a-b-c.

Those of skill in the art would further appreciate that the various illustrative logical blocks, modules, circuits, and algorithm steps described in connection with the embodiments disclosed herein may be implemented as specially configured electronic hardware, computer software, or combinations of both. To clearly illustrate this interchangeability of hardware and software, certain illustrative components, blocks, modules, circuits, and steps may be described in terms of their functionality. Whether such functionality is implemented as hardware or software depends, at least in part, upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as specifically programmed event processing computers, wireless communication devices, flow cytometers, or integrated circuit devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable medium may be a non-transitory storage medium. The techniques additionally, or alternatively, may be realized at least in part by a computer-readable communication medium that carries or communicates program code in the form of instructions or data structures and that can be accessed, read, and/or executed by a computing device, such as propagated signals or waves.

The program code may be executed by a specifically programmed graphics processor, which may include one or more processors, such as one or more digital signal processors (DSPs), configurable microprocessors, an application specific integrated circuits (ASICs), field programmable logic arrays (FPGAs), or other equivalent integrated or discrete logic circuitry. Such a graphics processor may be specially configured to perform any of the techniques described in this disclosure. A combination of computing devices, e.g., a combination of a DSP and a microprocessor, a plurality of microprocessors, one or more microprocessors in conjunction with a DSP core, or any other such configuration in at least partial data connectivity may implement one or more of the features describe. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding messages, or incorporated in a specialized graphic control card.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Various embodiments of the invention have been described. These and other embodiments are within the scope of the following claims.

What is claimed is:

1. A graphics control system for coordinated display of a plurality of representations of multi-parametric data for cells on a graphical user interface, wherein the multi-parametric data for a cell includes respective measurements for a plurality of parameters, the graphics control system comprising:

a plot generator configured to:
dynamically display, via a display device, a parallel coordinate plot diagram wherein the plurality of parameters are represented as a series of axes, wherein the parallel coordinate plot diagram includes a line connecting measurements for a cell on each of the series of axes for the respective parameter from the plurality of parameters, and wherein each axis is associated with a respective display region of the parallel coordinate plot diagram, and
dynamically display an interactive control in the display region of the parallel coordinate plot diagram associated with an axis included in the series of axes associated with a first parameter; and
an input device port configured to receive, from an input device, a first selection of the interactive control and an identification of a movement of the first selection,
wherein the plot generator is further configured to:
in response to receipt of the first selection of the interactive control, dynamically display, via the display device, a second plot diagram including a vertical axis corresponding to the first parameter and a horizontal axis corresponding to a second parameter of the plurality of parameters,
wherein the second plot diagram includes a graphical indicia for the cell at an intersection point for a first measurement for the first parameter for the cell and a second measurement for the second parameter for the cell, and
in response to receipt of the identification of the movement of the first selection, dynamically display, via the display device, a three-dimensional plot diagram of the first parameter, the second parameter, and a third parameter of the plurality of parameters.

2. The graphics control system of claim 1, wherein the second plot diagram comprises a two-dimensional scatter plot diagram.

3. The graphics control system of claim 1 wherein the input device port is further configured to receive, from the input device, a second selection identifying an area of interest on the second plot diagram, the area of interest including a first set of cells; and
- wherein the plot generator is further configured to, in response to receipt of the second selection:
  - identify, based at least in part on the second selection and the first set of cells, a second set of data points for the first set of cells to display, and
  - apply an adjustment to the display of the second set of data points as shown in:
    - (i) the parallel coordinate plot diagram, and
    - (ii) the second plot diagram,
    - wherein the adjustment to the display includes a transition from first renderings of the parallel coordinate plot diagram and the second plot diagram to second renderings of the parallel coordinate plot diagram and the second plot diagram.

4. The graphics control system of claim 3, wherein the plot generator is configured to apply the adjustment in part by changing colors of:
- (i) lines on the parallel coordinate plot diagram, and
- (ii) graphical indicia for the cell on the second plot diagram,
- wherein representations of a second set of cells are distinguished from representations of cells not included in the first set of cells.

5. The graphics control system of claim 4, wherein the plot generator is configured to change a color included in the colors comprises adjusting at least one of: a brightness level of the color, a hue of the color, a saturation level for the color, or a transparency for the color.

6. The graphics control system of claim 1, wherein the plot generator is further configured to, in response to receipt of the first selection of the interactive control, skew the display of the parallel coordinate plot diagram by an amount proportional to a level of interaction detected with the interactive control.

7. The graphics control system of claim 1, wherein the plot generator is configured to dynamically display the second plot diagram in part by:
- identifying a transition time based at least in part on a characteristic of the display device, the transition time identifying a speed for displaying the second plot diagram;
- identifying a number of incremental renderings for transitioning from a first rendering to a second rendering based at least in part on the transition time, wherein a representation of a point for the cell begins at a first location in the first rendering and moves to successive locations in respective incremental renderings to arrive at a final location in the second rendering; and
- causing successive display of the number of incremental renderings.

8. The graphics control system of claim 1,
- wherein the three-dimensional plot diagram includes a third axis corresponding to the third parameter, and
- wherein a length of the third axis is based at least in part on the movement of the first selection.

9. The graphics control system of claim 8, wherein the plot generator is configured to display the second plot diagram in response to the movement exceeding a threshold distance.

10. The graphics control system of claim 1, wherein the cell is taken from a sample;
- wherein the graphics control system comprises a particle analyzer input port for receiving, from a particle analyzer, measurements for a second cell from the sample; and
- wherein the plot generator is further configured to:
  - display an additional line on the parallel coordinate plot diagram connecting points on the vertical axes corresponding to the measurements for the second cell, and
  - display an additional graphic indicator for the second cell at an intersection point for a measurement for the second cell for the first parameter and a measurement for the second cell for the second parameter.

11. The graphics control system of claim 1, wherein the input device port is further configured to receive, from the input device, a third selection identifying a plurality of two-dimensional plot diagrams of the data for the cells, each two-dimensional plot diagram included in the plurality of two-dimensional plot diagrams representing measurements for the cells along two parameters included in the plurality of parameters,
- wherein a common parameter is represented by the horizontal axes of the two-dimensional plot diagrams, and
- wherein the vertical axes of the two-dimensional plot diagrams represent different parameters,
- wherein the plot generator is configured to dynamically display the parallel coordinate plot diagram in part based on the selection of two-dimensional plot diagrams, and
- wherein the parameters represented by the vertical axes of the two-dimensional plot diagrams are shown in the parallel coordinate plot diagram.

12. A computer-implemented method for coordinated display of a plurality of representations of multi-parametric data for particles on a graphical user interface, wherein the multi-parametric data for a particles includes respective measurements for a plurality of parameters, the computer-implemented method comprising:
- under control of one or more processors,
  - dynamically displaying, via a display device, a parallel coordinate plot diagram wherein the plurality of parameters are represented as a series of axes, wherein the parallel coordinate plot diagram includes a line connecting measurements for a particle on each of the series of axes for the respective parameter from the plurality of parameters, and wherein each axis is associated with a respective display region of the parallel coordinate plot;
  - dynamically displaying an interactive control in the display region of the parallel coordinate plot diagram associated with an axis included in the series of axes associated with a first parameter;
  - in response to a first selection of the interactive control, dynamically displaying, via the display device, a second plot diagram including a vertical axis corresponding to the first parameter and a horizontal axis corresponding to a second parameter of the plurality of parameters, and
  - wherein the second plot diagram includes a graphical indicia for the particle at an intersection point for a first measurement for the first parameter for the particle and a second measurement for the second parameter for the particle; and in response to an identification of a movement of the first selection, dynamically displaying, via the display device, a three-dimensional plot diagram of the first parameter, the second parameter, and a third parameter of the plurality of parameters.

13. The computer-implemented method of claim 12, wherein the second plot diagram comprises a two-dimensional scatter plot diagram.

14. The computer-implemented method of claim 12, further comprising:

receiving a second selection identifying an area of interest on the second plot diagram, the area of interest including a first set of particles; and in response to the second selection identifying the area of interest:

identifying, based at least in part on the second selection and the first set of particles, a second set of data points for the first set of particles to display; and applying an adjustment to the display of the second set of data points as shown in:
(i) the parallel coordinate plot diagram, and
(ii) the second plot diagram,
wherein the adjustment to the display includes a transition from first renderings of the parallel coordinate plot diagram and the second plot diagram to second renderings of the parallel coordinate plot diagram and the second plot diagram.

15. The computer-implemented method of claim 14, wherein applying the adjustment comprises:

changing colors of:
(i) lines on the parallel coordinate plot diagram, and
(ii) graphical indicia for the particle on the second plot diagram,
wherein representations of a second set of particles are distinguished from representations of particles not included in the first set of particles.

16. The computer-implemented method of claim 15, wherein changing a color included in the colors comprises adjusting at least one of: a brightness level of the color, a hue of the color, a saturation level for the color, or a transparency for the color.

17. The computer-implemented method of claim 12, further comprising, in response to receipt of the first selection of the interactive control, skewing the display of the parallel coordinate plot diagram by an amount proportional to a level of interaction detected with the interactive control.

18. The computer-implemented method of claim 12, wherein dynamically displaying the second plot diagram comprises:

identifying a transition time based at least in part on a characteristic of the display device, the transition time identifying a speed for displaying the second plot diagram;

identifying a number of incremental renderings for transitioning from a first rendering to a second rendering based at least in part on the transition time, wherein a representation of a point for the particle begins at a first location in the first rendering and moves to successive locations in respective incremental renderings to arrive at a final location in the second rendering; and causing successive display of the number of incremental renderings.

19. The computer-implemented method of claim 12, further comprising:

wherein the three-dimensional plot diagram includes a third axis corresponding to the third parameter, wherein a length of the third axis is based at least in part on the movement, and wherein the displaying of the second plot diagram is further performed in response to the movement exceeding a threshold distance.

20. A system for coordinated display of a plurality of representations of multi-parametric data for cells on a graphical user interface, the system comprising:

a particle analyzer configured to detect, for each of the cells, measurements for respective markers; and graphics processing circuitry in communication with the particle analyzer, the graphics processing circuitry configured to:

dynamically display, via a display device, a parallel coordinate plot diagram wherein the markers are represented as a series of axes, wherein the parallel coordinate plot diagram includes a line connecting measurements for a cell on each of the series of axes for the respective marker, and wherein each axis is associated with a respective display region of the parallel coordinate plot;

dynamically display an interactive control in the display region of the parallel coordinate plot diagram associated with an axis included in the series of axes associated with a first marker; and in response to a selection of the interactive control, dynamically display, via the display device, a second plot diagram including a vertical axis corresponding to the first marker and a horizontal axis corresponding to a second marker included in the markers, in response to an identification of a movement of the selection, dynamically display, via the display device, a three-dimensional plot diagram of the first marker, the second marker, and a third marker, and wherein the second plot diagram includes a graphical indicia for the cell at an intersection point for a first measurement for the first marker for the cell and a second measurement for the second marker for the cell.

* * * * *